United States Patent
Ambe

(10) Patent No.: US 6,873,602 B1
(45) Date of Patent: Mar. 29, 2005

(54) NETWORK SYSTEM, SWITCH, AND SERVER

(75) Inventor: Michiko Ambe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 09/620,119

(22) Filed: Jul. 20, 2000

(30) Foreign Application Priority Data

Aug. 6, 1999 (JP) .......................................... 11-223212

(51) Int. Cl.[7] ............................................. H04L 12/28
(52) U.S. Cl. ........................ 370/254; 370/338; 370/401
(58) Field of Search ..................... 370/395.33, 254–255, 370/99.5, 396, 351, 390, 336, 395.53, 914, 400–40, 395, 352–355, 94.5; 395/500, 200.23, 200, 200.49, 287.01

(56) References Cited

U.S. PATENT DOCUMENTS

| | | | | |
|---|---|---|---|---|
| 4,933,937 A | * | 6/1990 | Konishi ...................... | 370/404 |
| 5,752,003 A | * | 5/1998 | Hart ............................ | 709/223 |
| 5,774,662 A | * | 6/1998 | Sakagawa .............. | 370/395.54 |
| 5,777,989 A | * | 7/1998 | McGarvey ................ | 370/254 |
| 5,892,912 A | * | 4/1999 | Suzuki et al. .......... | 370/395.53 |
| 5,905,859 A | * | 5/1999 | Holloway et al. .......... | 713/201 |
| 6,061,334 A | * | 5/2000 | Berlovitch et al. ......... | 370/255 |
| 6,075,776 A | * | 6/2000 | Tanimoto et al. ........... | 370/254 |
| 6,147,995 A | * | 11/2000 | Dobbins et al. ............ | 370/392 |
| 6,496,484 B1 | * | 12/2002 | Suzuki ....................... | 370/254 |
| 6,697,360 B1 | * | 2/2004 | Gai et al. ................... | 370/389 |

FOREIGN PATENT DOCUMENTS

| | | |
|---|---|---|
| JP | 09284392 | 10/1997 |
| JP | 09289521 | 11/1997 |

* cited by examiner

*Primary Examiner*—Brian Nguyen
*Assistant Examiner*—Ian N. Moore
(74) *Attorney, Agent, or Firm*—Katten Muchin Zavis Rosenman

(57) ABSTRACT

A network system which automatically reconfigures its virtual LAN (VLAN) topology when a terminal station is relocated or newly added. When a terminal is relocated from one switch's local group to another switch's, the latter switch examines incoming frames from the relocated terminal, consulting its VLAN configuration table stored in a first storage unit. If this terminal turns out to be unknown to the switch, a query unit in the switch will request information about the unknown terminal by sending a query message to a server that manages the configuration of the network system. In response to the query, a searching unit in the server scans data records in a second storage unit, thus recognizing that the terminal in question has been relocated. The server then identifies to which VLAN the terminal is supposed to belong. A transmission unit in the server sends this information back to the requesting switch. According to the response from the server, an updating unit in the switch modifies its VLAN configuration table stored in the first storage unit.

7 Claims, 22 Drawing Sheets

| RECEIVE PORT | TAG FORMAT | SOURCE MAC ADDRESS | SOURCE IP ADDRESS | FUNCTION | VID |
|---|---|---|---|---|---|
| P20 | YES | — | — | — | 4, 5 |
| P21 | NO | 010101020304 | 1.3.4.1 | RELAY | 4 |
| P22 | NO | 010101020305 | 1.3.5.1 | RELAY | 5 |
| P23 | NO | 010101020306 | 1.3.4.2 | RELAY | 4 |

FIG. 5

| SWITCH ID | SWITCH IP ADDRESS | ATTRIBUTE | SUPPORTED VLAN |
|---|---|---|---|
| 11-1 | 12.11.12.1 | EGAWA | all |
| 11-2 | 12.11.12.2 | EGAWA | 4, 6, 9 |
| 11-3 | 12.11.12.3 | UCHIYAMA | 4, 6, 9 |
| 11-4 | 12.11.12.4 | EGAWA | 2 to 10 |

FIG. 7

| HOST NAME | IP ADDRESS | SUBNET MASK | VID | CONNECTABLE SWITCH | CURRENT LOCAL SWITCH |
|---|---|---|---|---|---|
| 10-1 | 1.3.4.1 | 255.255.255.255 | 4 | 11-2, 11-3, 11-4 | 11-2 |
| 10-2 | 1.3.5.1 | 255.255.255.255 | 5 | 11-2, 11-3, 11-4 | 11-2 |
| 10-3 | 1.3.4.2 | 255.255.255.255 | 4 | 11-2, 11-3, 11-4 | 11-2 |
| 10-4 | 1.3.5.2 | 255.255.255.255 | 5 | 11-2, 11-3, 11-4 | 11-3 |
| 10-5 | 1.3.4.3 | 255.255.255.255 | 4 | 11-2, 11-3, 11-4 | 11-3 |
| 10-6 | 1.3.5.3 | 255.255.255.255 | 5 | 11-2, 11-3, 11-4 | 11-3 |
| 10-7 | 1.3.4.4 | 255.255.255.255 | 4 | 11-2, 11-3, 11-4 | 11-4 |
| - | 1.3.6.1 | 255.255.255.0 | 5 | All | Unknown |

FIG. 8

| VID | IP ADDRESS | SUBNET MASK |
|---|---|---|
| 4 | 1. 3. 4. 5 | 255. 255. 255. 0 |
| 5 | 1. 3. 6. 9 | 255. 255. 255. 0 |
| 6 | 1. 3. 5. 1 | 255. 255. 255. 0 |
| 7 | 1. 3. 11. 1 | 255. 255. 255. 255 |

FIG. 9

NETWORK SYSTEM, SWITCH, AND SERVER

BACKGROUND OF THE INVENTION

1. Field of the Invention

The present invention relates to a network system, a switch, and a server. More particularly, the present invention relates to a network system comprising a plurality of terminals, a plurality of switches which interconnects those terminals and select correct packet destinations, and a server for controlling those switches. The present invention further relates to a switch and server for use in the above network system.

2. Description of the Related Art

In the context of effective use of limited bandwidth resources in a local area network (LAN), confining the broadcast domain, i.e., the area within which broadcast frames can reach, is one of the promising approaches. Virtual LAN (abbreviated as "VLAN" where appropriate) is known as an enabling technology for this, which allows logical grouping of user terminal stations regardless of their physical locations and connections.

FIG. 20 shows an example of a conventional network system which supports virtual LAN configurations. This system involves a plurality of terminals T1 to T6, which are represented as white and black circles in this FIG. 20. Actually, those terminals are divided into two logical groups, each forming a separate virtual LAN environment; the black-circle terminals belong to a first VLAN, while the white-circle terminals to a second VLAN. Four multiple-port switches SW1 to SW4 are deployed to interconnect the terminals T1 to T6, in each of which appropriate internal connections are provided between the ports for transit switching of transmission frames. Receiving frames from one port, the switches SW1 to SW4 retransmit them to other relevant ports after adding an appropriate tag to each frame in order to indicate to which VLAN the source terminal belongs. When such a tagged frame has reached the last leg of its route, the switch removes the tag from the frame before sending it out to the destination. The network system further comprises a server SV whose services are accessible to the terminals T1 to T6 through the switches SW1 to SW4.

The above conventional network system operates as follows. Suppose here that the terminal T1 is attempting to send a broadcast frame FR. FIG. 21 shows how this frame is transported. The broadcast frame FR transmitted from the terminal T1 first reaches the port P11 of the switch SW2. In this switch SW2, the frame FR is added a tag TG indicating that the source terminal T1 belongs to the second VLAN. Frames in which a tag field has been added are called "tagged frames." The switch SW2 then retransmits this tagged frame FR toward the next switch SW1 through its port P10.

FIG. 22 provides the detailed structure of an Ethernet frame with a tag field d2. As seen from FIG. 22, the tag field d2 is interposed between MAC header d1 and IP header d3. It is actually composed of the following three fields: User_Priority field d21, Canonical Format Identifier (CFI) field d22, and VLAN Identifier (VID) field a d23. The VID information enables a switch to forward a received tagged frame to the correct direction. That is, the switch determines which port should be used to output the frame, referring to the content of its VID field d23.

Returning to the context of FIGS. 20 and 21, the switch SW1 now receives the frame FR through its port P21. The switch SW1 then determines which port should be used to output the frame FR, referring to its tag field TG. Notice that, in the example system, the terminal T4 coupled to the switch SW3 is a member of the second VLAN and there are no other receiving terminals belonging to that group. Accordingly, the switch SW1 chooses its port P22 to send out the broadcast frame FR (see FIG. 21). Now the switch SW3 receives this frame FR at its port P30 and chooses a relevant output port by examining the tag field TG again. In the present case, the switch SW3 retransmits the frame FR through the port P31 after removing the tag field TG therefrom (see the last leg of the route shown in FIG. 21). In this way, the broadcast frame FR originating from the terminal T1 is delivered to the terminal T4, which is the only receiving member of the second VLAN.

There is a standardized format of the tag field (IEEE 802.1Q) for the purpose of VLAN implementations, and switches conforming to the standard specifications are increasingly common in the market today. As opposed to this increasing prevalence of standardized switch products, few terminal stations (including network interface cards for them) support the standard specifications for VLAN. To construct VLANs, it is therefore necessary to define VLAN membership for each port of each switch. This is, however, a troublesome task particularly in such a network where the terminals are administrated under an IP address based management policy. That is, the network administrator has to manually change the VLAN membership definitions of a relevant switch, every time a terminal station is moved, added, or removed.

SUMMARY OF THE INVENTION

Taking the above into consideration, an object of the present invention is to provide a network system which eliminates the need for changing VLAN definitions even if a member terminal is relocated, added, or removed.

To accomplish the above object, according to the present invention, there is provided a network system comprising a plurality of terminals, a plurality of switches, and a server. Each terminal belongs to one of a plurality of logical groups, or VLANs. The switches interconnect the terminals, receiving and forwarding the packets originating therefrom. Each switch comprises: a first storage unit which stores information that is used to identify logical group membership of the source terminal of a received packet; a query unit which sends a query to the server to request information about the logical group membership, when the first storage unit has failed to provide sufficient information to identify the logical group membership of a particular source terminal; and an updating unit which updates the information stored in the first storage unit according to a response to the query. To control the switches, the server comprises: a second storage unit which stores a list of identifiers of the terminals, in association with the logical groups to which the terminals belong; a searching unit which searches the second storage unit in response to the query from the requesting switch; and a transmission unit which sends the search result to the requesting switch.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram which shows an example of a VLAN configuration table stored in a memory of the switch shown in FIG. 4;

FIG. 7 is a diagram which shows an example of a switch data table stored in a hard disk (HDD) unit shown in FIG. 6;

FIG. 8 is a diagram which shows an example of a terminal data table stored in the HDD unit shown in FIG. 6;

FIG. 9 is a diagram which shows an example of a VID data table stored in the HDD unit shown in FIG. 6;

FIG. 11(A) shows the general structure of frames for query, response, and notification;

FIG. 11(B) shows the detailed structure of frames for query and response:

FIG. 11(C) shows the detailed structure of frames for notification;

FIG. 18(A) shows the entire structure of an SNMP frame;

FIG. 18(B) shows the detailed data structure of PDU field shown in FIG. 18(A);

FIG. 18(C) shows the detailed data structure of VarBindList field shown in FIG. 18(B);

FIG. 19(A) shows the entire structure of a COPS frame;

FIG. 19(B) shows the detailed data structure of PDU field shown in FIG. 19(A);

DESCRIPTION OF THE PREFERRED EMBODIMENTS

A preferred embodiment of the present invention will be described below with reference to the accompanying drawings.

Figure 1:
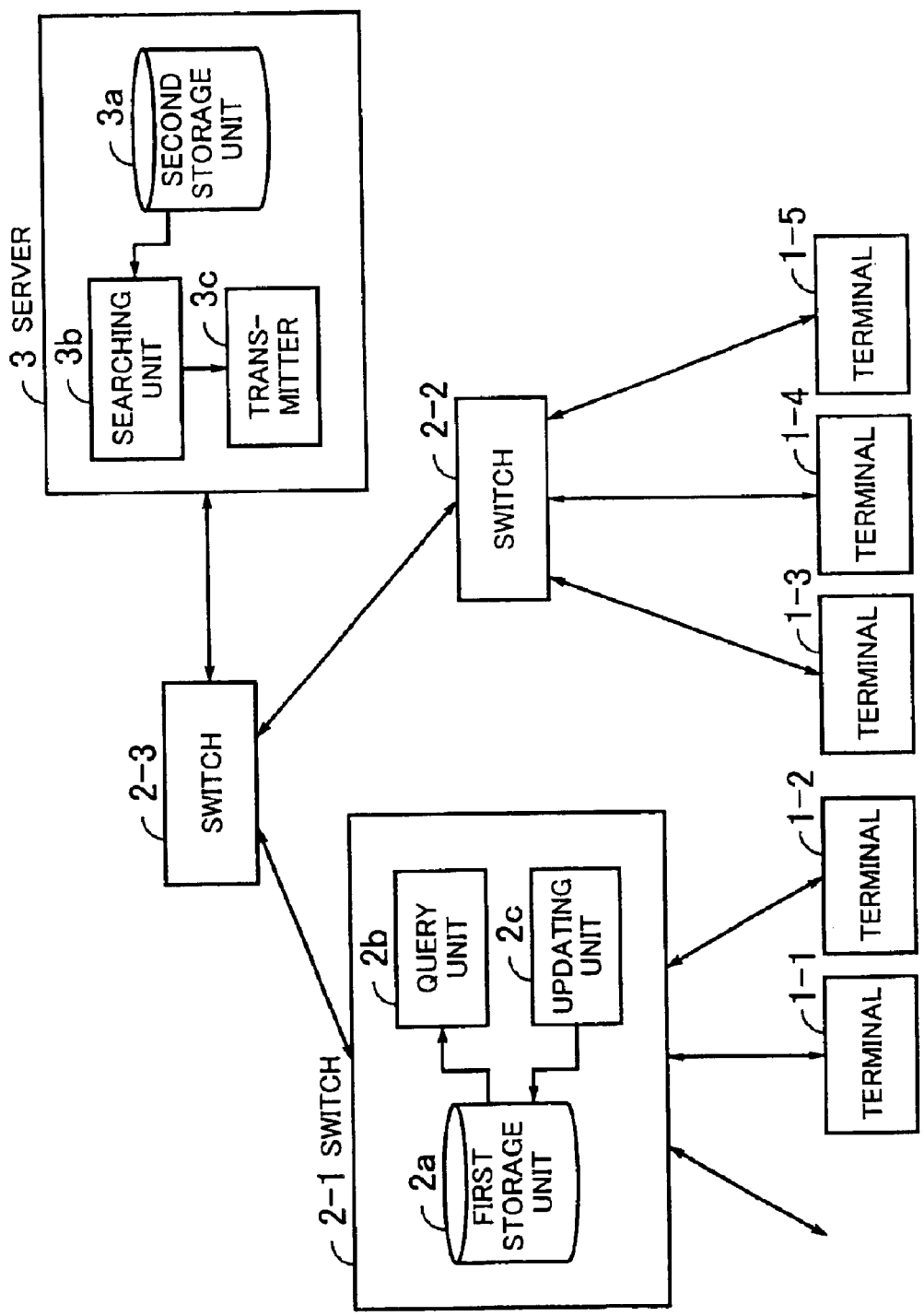
FIG. 1 is a conceptual view of the present invention.

FIG. 1 shows a conceptual view of the present invention. Terminals 1-1 to 1-5 shown in FIG. 1 are end stations, each constructed on an appropriate software and hardware platform such as personal computers. A plurality of switches 2-1 to 2-3 are coupled to those terminals to flexibly form one or more logical subnetworks. When a message frame, or packet, is received from their local terminals, the switches 2-1 to 2-3 retransmits it through a relevant port after adding an appropriate tag to it. The switches 2-1 to 2-3 also receive transit frames from adjacent switches and redirect them to appropriate ports, referring to their respective tags. When forwarding a received frame to their local terminals, the switches 2-1 to 2-3 output the frame after removing its tag.

The following section will describe the structure of the switch 2-1; the same can be applied to the other two switches 2-2 and 2-3. The switch 2-1 comprises a first storage unit 2a, a query unit 2b, and an updating unit 2c. The first storage unit 2a stores information to be used in identifying a specific logical group (i.e., virtual LAN) to which the source terminal of a received packet belongs. Virtual LAN (VLAN) refers to what is called a "subnet" in the TCP/IP network terminology. More strictly speaking, the term "VLAN" refers to a broadcast domain within which MAC-layer broadcast frames (i.e., frames directed to all terminals in a network) are confined. The query unit 2b sends a query message to the server 3 when the logical group of the source terminal cannot be identified in spite of a search on the first storage unit 2a. The updating unit 2c updates information in the first storage unit 2a according to the result of a query issued by the query unit 2b.

The server 3 comprises a second storage unit 3a, a searching unit 3b, and a transmitter 3c. When a query message is received from either of the switches 2-1 to 2-3, the server 3 performs a search on the second storage unit 3a and returns a relevant record to the requesting switch. More specifically, the second storage unit 3a stores a list of identifiers of the terminals, in association with the logical groups to which the terminals belong. The searching unit 3b searches the second storage unit 3a in response to a query from a switch. The transmitter 3c sends the search result back to the requesting switch.

Figure 2:
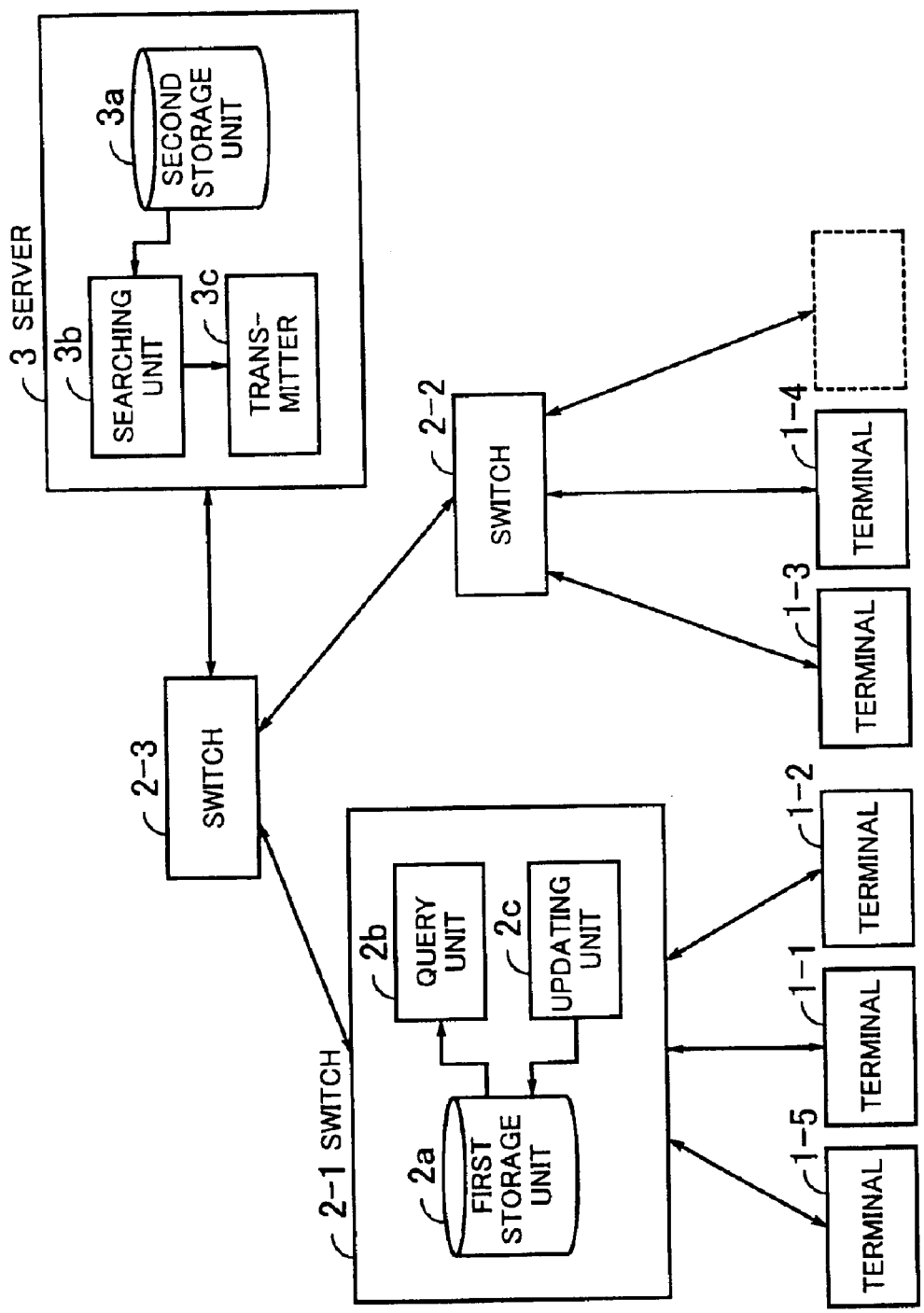
FIG. 2 is a diagram showing a situation where one of the terminals has been relocated in the network system of FIG. 1.

According to the present invention, the proposed network system operates as follows. Suppose here that the terminal 1-5 is removed from the switch 2-2 and relocated to the local terminal group of the switch 2-1, as illustrated in FIG. 2, while maintaining the IP address of the terminal. Here, the "local terminal group of a specific switch" refers to a group of terminals that are directly connected to that switch. Once the relocation is completed, the switch 2-1 begins to receive frames from the terminal 1-5. Although the IP address of the new terminal 1-5 is known, the switch 2-1 has no other relevant information in its own first storage unit 2a at this initial stage, thus being unable to identify the VLAN membership of the terminal 1-5 in question. This situation causes the query unit 2b send a query message to the server 3, giving the IP address as a clue to identify the terminal in question. Triggered by the query, the searching unit 3b in the server 3 searches the second storage unit 3a by using the given IP address as a search keyword, in an attempt to provide information about the VLAN membership of the terminal 1-5. If the search is successfully finished, the transmitter 3c sends the result back to the requesting switch 2-1. The transmitter 3c also notifies the switch 22 that the terminal 1-5 has moved from the local terminal group of the switch 2-2 to that of the switch 2-1.

Inside the switch 2-1, the updating unit 2c updates the data stored in the first storage unit 2a according to the search result sent from the server 3. Having sufficient information about the relocated terminal 1-5, the switch 2-1 now begins forwarding of frames transmitted from the terminal 1-5. Each such frame is added an appropriate tag field that indicates a particular VLAN where the terminal 1-5 belongs. Since the above notification is forwarded to the remaining switches 2-2 and 2-3, frames originating from other terminals within the same VLAN can also be delivered correctly to the terminal 1-5.

In some cases, it may not be necessary to redistribute the relocation notification over the network, because other switches can learn the facts about the relocation of the terminal 1-5 when they actually receive and process a frame originating from the terminal 1-5. This frame also provides information implying that the switch 2-1 is serving the terminal 1-5 at present. This implicit relocation notification, however, is disadvantageous for the following reason. Suppose, for example, that a certain terminal has sent a frame to the terminal 1-5 just after the relocation. Until they learn that the terminal 1-5 has moved to the switch 2-1's local terminal group, the switches would route the frame toward the old location (i.e., switch 2-2), thus failing to deliver it to the correct destination. To avoid this problem, it is desirable to send the notification to the switches in an explicit fashion.

As can be seen from the above discussion, the proposed network system is arranged to update VLAN configurations automatically when a terminal is relocated, through a query and response process between a switch and a server. This automatic reconfiguration function will alleviate the workload imposed on the network administrators.

Figure 3:
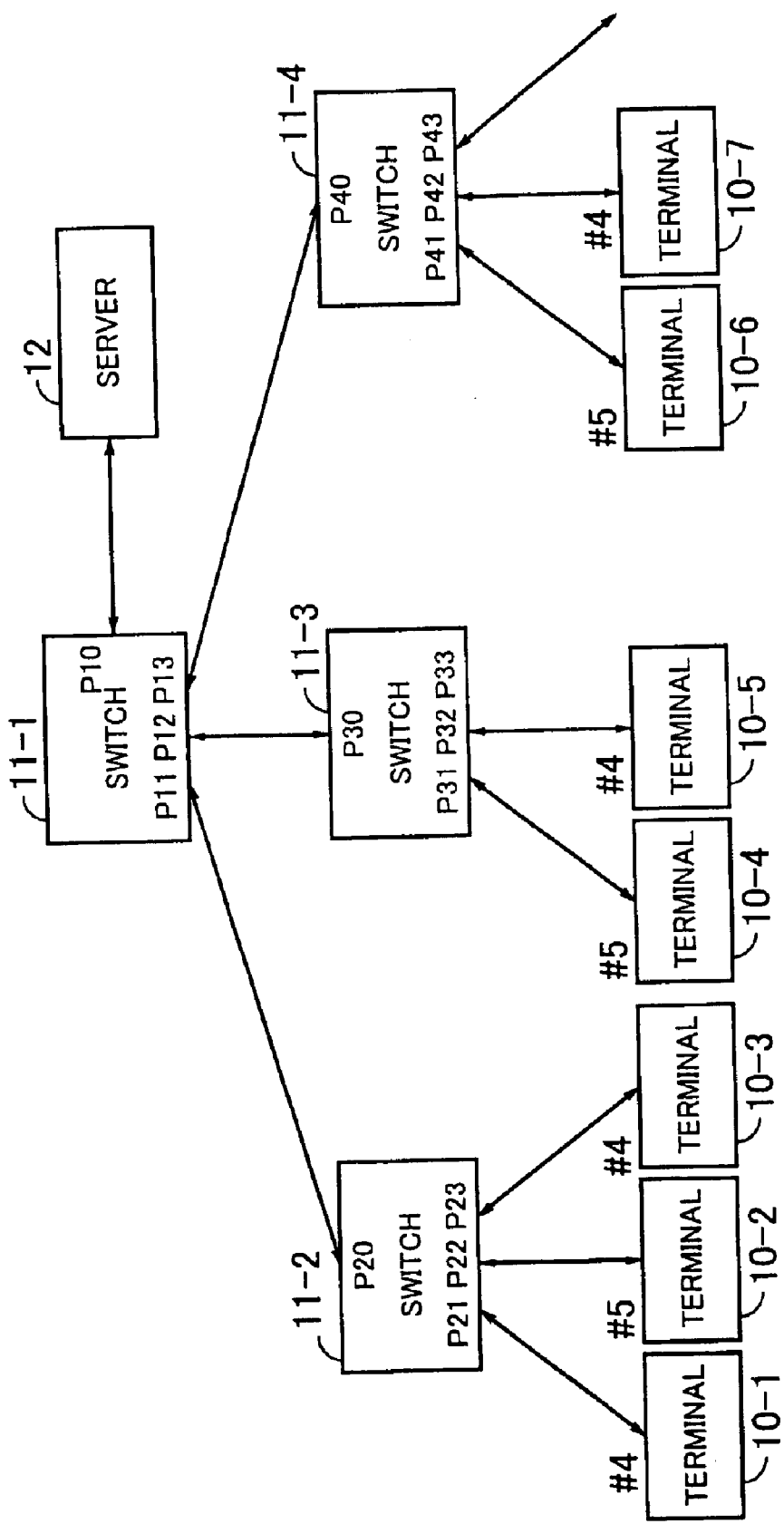
FIG. 3 is a total block diagram of an embodiment of the present invention.

A more specific embodiment of the present invention will now be described below. FIG. 3 is a total block diagram of an embodiment of the present invention. This network system includes a plurality of switches 11-1 to 11-4, each having four ports identified by port numbers Pn (n=10, 12, . . . , 43) as shown in FIG. 3. The system further includes a plurality of terminals 10-1 to 10-7. The numeral with a number sign (e.g., #4, #5) placed near the upper-left corner of each box represents the identifier of a specific VLAN to which the terminal belongs.

The terminals 10-1 to 10-7 are end stations based on a personal computer or other platform, which send and receive data packets to/from each other, including documents, engineering drawings, and any other data objects created by users. The switches 11-1 to 11-4, coupled to those terminals 10-1 to 10-7, receive frames from their local terminals, and retransmit them toward their respective destinations through appropriate ports, after adding a tag that indicates a particular VLAN where each source terminal belongs. The switches 11-1 to 11-4 send such a tagged frame to the next leg of a route, thereby relaying the frame toward its destinations. When the next leg is the last link to the destination, they remove the tag from the frame and send it out through a relevant port.

Figure 4:
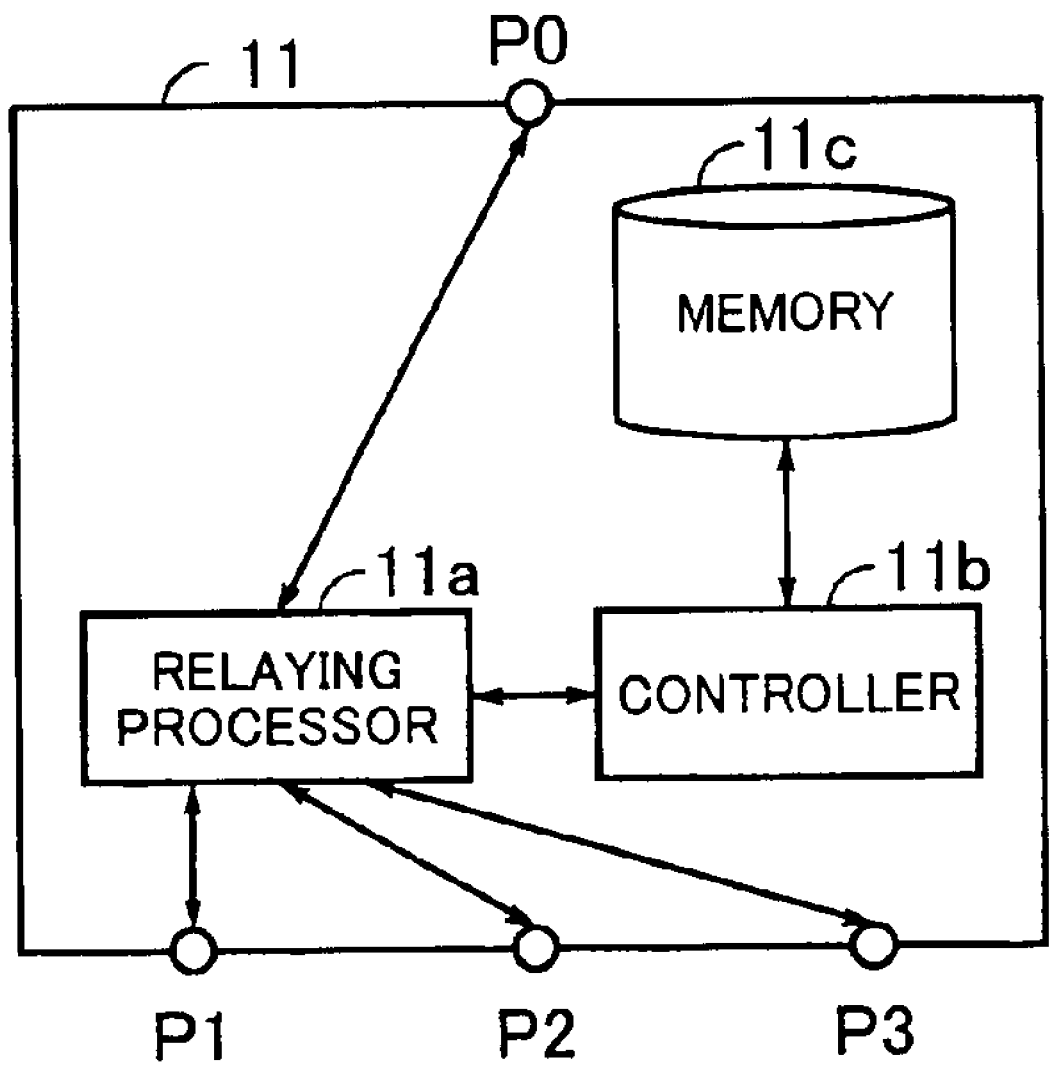
FIG. 4 is a diagram which shows the details of a switch shown in FIG. 3.

Now the switches 11-1 to 11-4 are referred to collectively as the switches 11, whose details are depicted in FIG. 4. The switch 11 comprises a relaying processor 11a, a controller 11b, and a memory 11c. The primary role of the switch 11 is to relay transmission frames through its ports P0 to P3. To this end, the relaying processor 11a accepts and redirects the frames to their relevant ports, under the control of the controller 11b. The controller 11b performs various processing tasks according to programs and data stored in the memory 11c, as well as governing other parts of the switch 11. The memory 11c is composed of semiconductor memory devices or other storage components, being arranged to store software programs for the controller 11b, as well as other data such as a VLAN configuration table described in the next paragraph.

FIG. 5 shows an example of a VLAN configuration table stored in the memory 11c. Specifically, this example shows a table used in the switch 11-2 (FIG. 3). This VLAN configuration table has the following data fields to describe the current setup of each port.

"Receive Port" field in the left-most column lists the four ports P20 to P23 of the switch 11-2.

"Tag format" field in the next column shows whether the incoming frames have a tag. More specifically, if the port is directly linked to the switch's local terminal group, the incoming frames have no tag field. If this is the case, the "Tag Format" field is marked "No." To the contrary, if the port is used to link with another switch (as in the case of port P20), every incoming frame must have a tag, and thus the "Tag Format" field is marked "Yes."

"Source MAC Address" and "Source IP Address" fields contain the MAC address and IP address of the terminal that is connected to each port.

"Function" field indicates how to handle incoming frames received at each port. More specifically, the relaying processor 11a will either "discard" or "relay" those frames.

Figure 22:
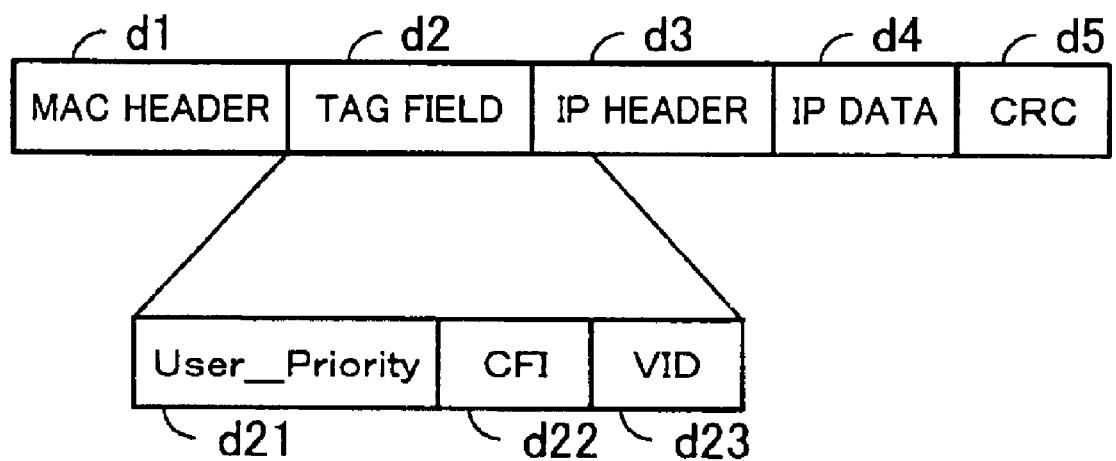
FIG. 22 is a diagram which shows the details of a frame and tag.

"VID" field in the right-most column shows the identifiers of VLANs being supported by each port. Every tagged frame carries a virtual LAN identifier (VID) as described earlier in FIG. 22, and the VID field of a VLAN configuration table shows specific VID values that qualify broadcast frames to pass through the port. For instance, the table entry for port P21 indicates that the port P21 is intended for transport of broadcast frames within the domain of VLAN #4. Consequently, the terminal 10-1, which is coupled to the port P21, will receive broadcast frames intended for VLAN #4 exclusively.

In addition to the VLAN configuration table described above, the memory 11c stores the following information, which should be defined and saved in a system initialization procedure.

(1) IP address of a server to which the switch 11 would sends a query message when the VLAN configuration table lacks information about a received frame. In the present example, the IP address of the server 12 is stored in the memory 11c.

(2) Policy for handling possible changes in its local terminals or port connections. More specifically, the switch 11 may either request the server 12 to provide necessary information, or update the configuration data by itself.

Figure 6:
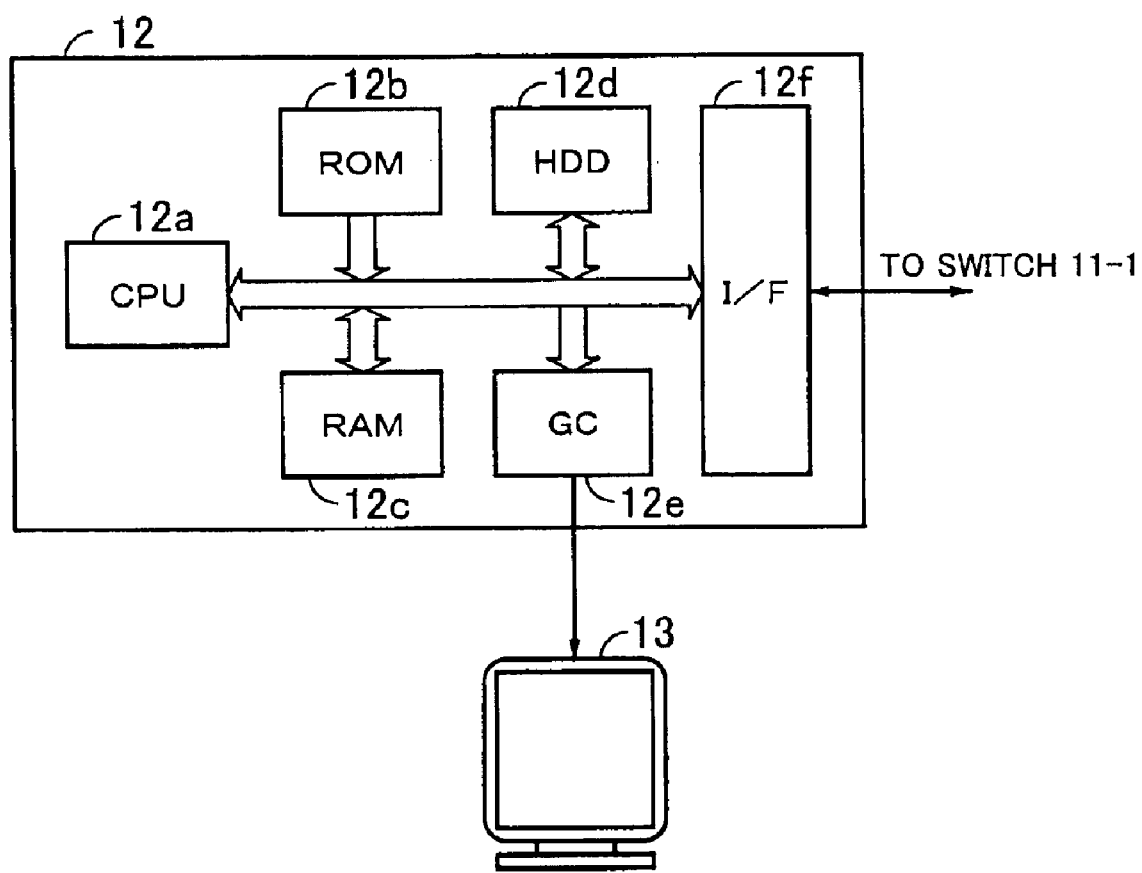
FIG. 6 is a diagram which shows the details of a server shown in FIG. 3.

Referring back to FIG. 3, the server 12 is designed to retrieve and provide information to the terminals 10-1 to 10-7 in response to their queries. The details of this server 12 is shown in FIG. 6. The server 12 comprises: a central processing unit (CPU) 12a, a read-only memory (ROM) 12b, a random access memory (RAM) 12c, a hard disk drive (HDD) unit 12d, a graphics control card (GC) 12e, and a network interface (I/F) 12f. An external monitor unit 13 (e.g., cathode ray tube (CRT) display) is coupled to the graphics control card.

The CPU 12a performs various operations according to programs stored in the RAM 12c, besides controlling other parts of the server 12. The ROM 12b stores basic programs and data that the CPU 12a executes and manipulates. The RAM 12c serves as temporary storage for application programs and scratchpad data that the CPU 12a executes and manipulates at runtime. The HDD unit 12d stores various application programs to be executed by the CPU 12a. Also stored in the HDD unit 12d are: a switch data table, a terminal data table, and a VID data table, which will be subsequently described.

FIG. 7 shows an example of a switch data table stored in the HDD unit 12d. This table has the following data fields to describe the current setup of switches in the network system.

"Switch ID" field shows the identifier, or name, of each switch.

"Switch IP address" field shows the IP address assigned to each switch.

"Attribute" field provides additional information about each switch, such as the administrator's name and the location of a switch.

"Supported VLAN" field shows which VLANs each switch can support.

The Supported VLAN field is used as follows. Take the first entry of the table for instance. The Supported VLAN field of this entry is set to "all," meaning that the switch 11-1 can provide connection paths of any VLANs being available. The second and third table entries show a list of VIDs "4, 6, 9," indicating that the switches 11-2 and 11-3 can provide connection paths of VLANs #4, #6, and #9. Further, in the last entry of the table, the Supported VLAN field contains a range of VIDs "2 to 10," which means that the switch 11-4 can provide connection paths of VLANs #2 to #10. The VLAN connectivity of each switch is confined as such. This reduces the chances of an outsider gaining access to the VLANs, thus improving network security.

FIG. 8 shows an example of a terminal data table stored in the HDD unit 12d, which provides various setup parameters related to each terminal in table form. This table has the following data fields.

"Host Name" field shows the host name assigned to each terminal 10-1 to 10-7.

"IP Address" field shows the IP address assigned to each terminal 10-1 to 10-7.

"Subnet Mask" field indicates the subnet mask value applicable to each terminal 10-1 to 10-7. A terminal can be identified by either one of its host name, IP address, and subnet number (i.e., IP address+subnet mask), meaning that other parameters can be calculated or resolved from a known parameter. Suppose, for example, that the server 12 initially knows only the host name of a terminal. Then the server 12 obtains the IP address and subnet mask of the terminal by sending a request to a domain name system (DNS) server (not shown).

"VID" field contains an identifier that shows to which VLAN each terminal belongs.

"Connectable Switch" field contains a list of switches that each terminal can be connected. The first table entry, for example, tells that the terminal 10-1 can be connected to either of the switches 11-2 to 11-4. The relocation of a terminal is confined in this way, providing improved network security.

"Current Local Switch" field indicates to which switch each terminal is connected at present.

FIG. 9 shows an example of a VID data table stored in the HDD unit 12d, which is used to determine which VLAN should accommodate a terminal, when it is newly added. The VID data table has the following data fields for each VLAN.

"VID" field contains the identifier of each VLAN, i.e., virtual LAN ID (VID).

"IP address" field indicates the IP address assigned to each VLAN.

"Subnet Mask" field contains the subnet mask value applied to each VLAN.

Besides storing the above three tables, the HDD unit 12d maintains the following information, which should be defined and saved in a system initialization procedure.

(3) Policy for handling a query from an unknown switch that has no relevant entry in the switch data table (FIG. 7). More specifically, the server 12 may either update the table autonomously, or notify the network administrator before any update is made.

(4) VID specification used when a new entry is added to the switch data table as a consequence of the above item (3). This information determines which VLANs a newly enrolled switch should support. The VID specification is designated in either of the following forms: keyword "all"; a range of VIDs; and a list of VIDs.

(5) Policy for creating a new entry of the terminal data table (FIG. 8) when there is a query about an unknown terminal that has no relevant entry in the table. Options for such a terminal may include: add a new entry whenever necessary; add a new entry only when the terminal is allowed to become a member of a specific VLAN; and notify the network administrator before any update is made.

Referring back to FIG. 6, the graphics control card 12e produces image data in accordance with drawing commands from the CPU 12a and provides the monitor unit 13 with the resultant images in the form of video signals. The interface 12f performs protocol translation and data format conversion to allow the server 12 to communicate with its nearest network device (the switch 11-1 in the present case).

Figure 10:
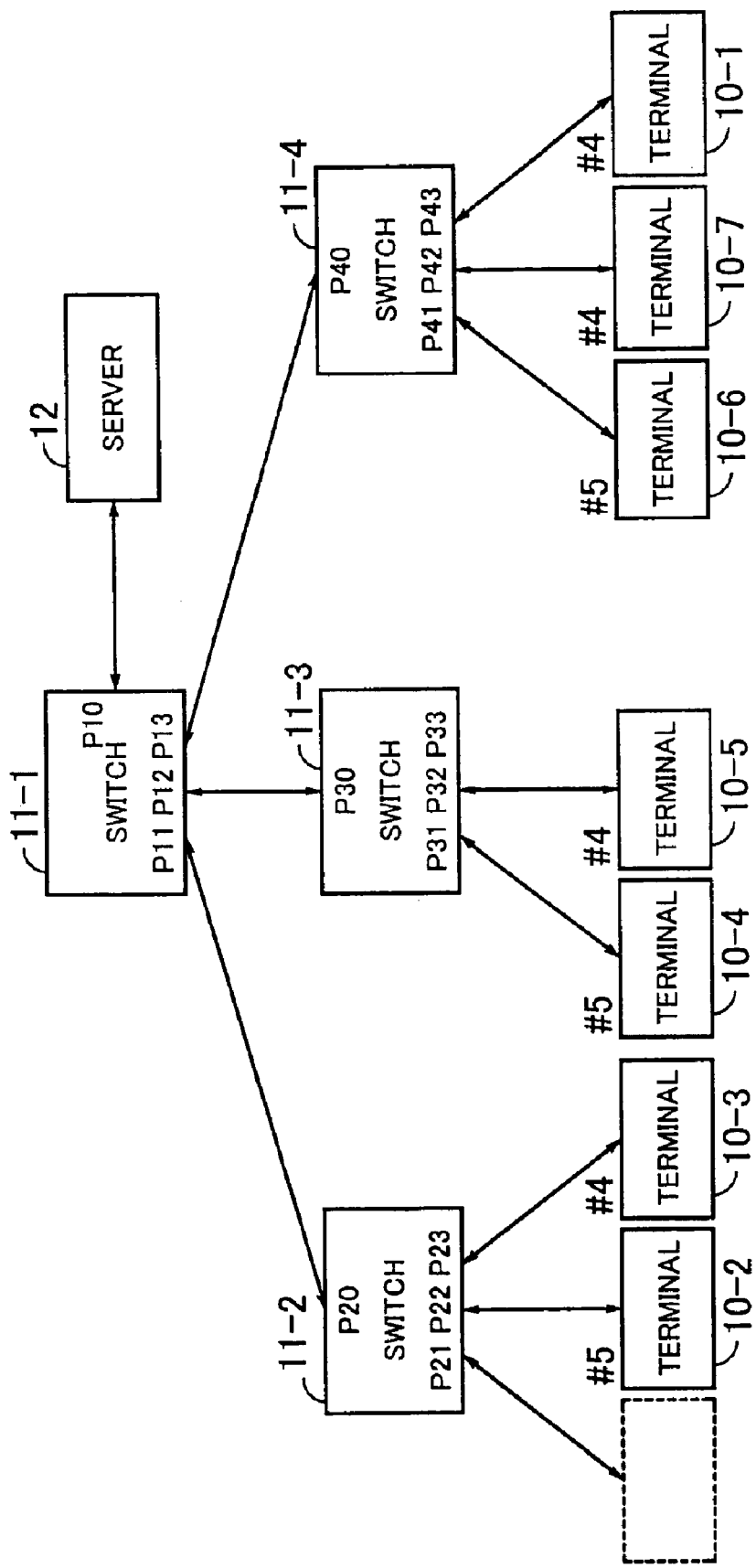
FIG. 10 is a diagram showing a situation where one of the terminals has been relocated in the system of FIG. 3.

According to the above embodiment of the invention, the network system operates as follows. Referring to FIG. 10, it is assumed here that the terminal 10-1 has been disconnected from the switch 11-2 and moved to the local terminal group of the switch 11-4. Outgoing frames from the terminal 10-1 are now being entered to the port P43 of the switch 11-4. With reference to its local VLAN configuration table (FIG. 5), the switch 11-4 finds out that those frames are coming from some unknown terminal that has no relevant record in the table. The switch 11-4 thus sends a query message to the server 12, requesting information about this unknown terminal 10-1. Frames received from the terminal 10-1 are either queued in the switch 11-4 or just discarded, until the server 12 responds and the table is updated accordingly.

Figure 11A:
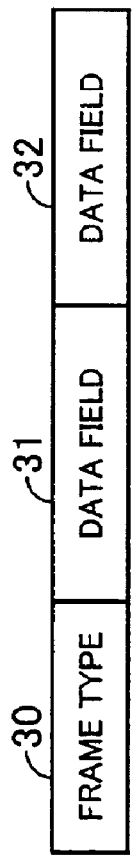
FIGS. 11(A), 11(B), and 11(C) are diagrams which show a few examples of frames exchanged between a switch and a server shown in FIG. 3.
Figure 11B:
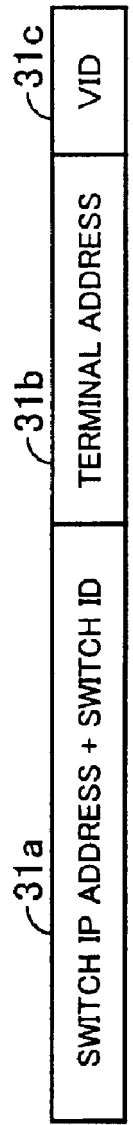
Figure 11C:
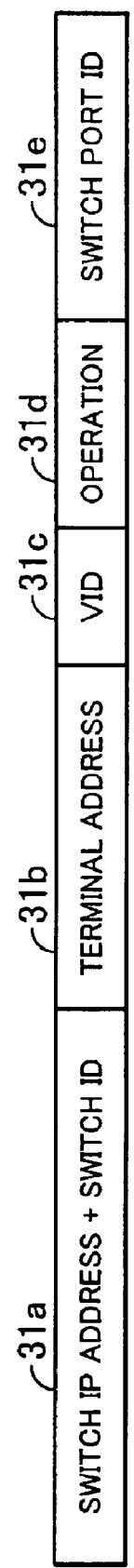

FIGS. 11(A), 11(B), and 11(C) present the frame formats used in a query and response session between the switch 11-4 and server 12. First, FIG. 11(A) shows the structure of frames for query, response, or notification, which is composed of the following fields.

"Frame type" field 30 contains information that shows what the frame is intended for (i.e., query, response, or notification).

"Data" fields 31 and 32 each contain either a query/response frame shown in FIG. 11(B) or a notification frame shown in FIG. 11(C).

The frame of FIG. 11(A) can encapsulate a plurality of messages in its data fields, allowing simultaneous inquiries about different terminals.

FIG. 11(B) shows a query/response frame, which is composed of the following fields.

Header field ("switch IP address+switch ID") 31a indicates the IP address and identifier of the requesting switch.

"Terminal address" field 31b contains the MAC address of a terminal in question.

"VID" field 31c is left blank when the frame is used as a query message; it conveys a VID value that has been obtained as a search result when the frame is used as a response message.

Referring back to FIG. 10, the query message sent from the switch 11-4 is delivered to the server 12 via the switch 11-1. Upon receipt of the message, the server 12 extracts therefrom the header field 31a (FIG. 11(B)). With this extracted header information, the server 12 consults its switch data table (FIG. 7) to determine whether the requesting switch is registered as a valid switch. If a relevant record is found in the switch data table, the server 12 then extracts the terminal address field 31b (FIG. 11(B)) and searches the terminal data table (FIG. 8) for a record that is relevant to the terminal in question. If a relevant record is found in the table, the server 12 retrieves its VID from the record. In the present example, the VLAN membership information on the terminal 10-1 is being requested, and the terminal data table (FIG. 8) has it in the first entry. Thus the server 12 successfully yields a VID value of "4" which indicates that the terminal 10-1 has a membership in the VLAN #4.

Now that the terminal in question has been identified, the server 12 looks up the switch data table (FIG. 7) to determine whether the requesting switch 11-4 supports a connection to the VLAN #4. In the present example, this connection can be provided because the switch 11-4 supports VLANs #2 to #10 as shown in FIG. 7. Subsequently, the server 12 updates its terminal data table (FIG. 8), altering the "Current Local Switch" field value of the relevant entry from "switch 11-2" to "switch 11-4." After that, the server 12 assembles a response frame by arranging the IP address and identifier of the switch 11-4, as well as the MAC address and VID of the identified terminal 10-1, according to the field sequence shown in FIG. 11(B). This response frame is transmitted to the switch 11-4. Upon receipt of the response frame, the switch 11-4 updates its own VLAN configuration table (FIG. 5) in such a way that the entry of port P43 will contain necessary parameters of the terminal 10-1 and the VID value of "4." The switch 11-4 is now ready to perform the tagging of transmission frames originating from the terminal 10-1. The VID value of "4" in the tagged frames indicates that the source terminal 10-1 belongs to VLAN #4, allowing the other switches to handle those frames accordingly.

Besides responding to the switch 11-4, the server 12 sends a notification frame to inform the switch 11-2 that the terminal 10-1 has left its local terminal group. The notification frame is structured into a plurality of data fields, as shown in FIG. 11(C). In the present example, they are:

Header ("switch IP address+switch ID") field 31a contains the IP address and identifier of the switch 112.

"Terminal address" field 31b indicates the MAC address of the terminal 10-1.

"VID" field 31c contains a value of "4."

"Operation" field 31d specifies a "Delete" operation.

"Switch port ID" field 31e indicates port P21 which is where the terminal 10-1 has previously been connected. Receiving such a notification frame, the switch 11-2 removes any obsolete entry from its local VLAN configuration table.

Further, the server 12 issues another notification frame to inform the switch 11-1 that a terminal with a VID of "4" has been added somewhere beyond the link extending from port P13 of the switch 11-1. This means that the port P13 is now required to handle tagged frames containing a VID value of "4" because of the relocation of the terminal 10-1. With such a notification frame received from the server 12, the switch 11-1 updates its local VLAN configuration table accordingly. The above notification frame, however, may not be provided when the switch 11-1 supports the GARP VLAN registration protocol (GVRP), or when the switch 11-1 has no knowledge about the network topology. GVRP is an optional function for automatic distribution of VLAN configuration data, which is stipulated in the IEEE 802.1Q standard. GARP denotes the generic attribute registration protocol.

To summarize the above section, when a terminal is relocated, its local switch sends a query to the server 12 to identify to which VLAN the terminal belongs. The VLAN configuration table in each switch is updated in accordance with the new setup. In this way, the proposed system automatically reconfigures itself when a terminal is relocated, thus reducing the workload of the network administrators.

Figure 12:
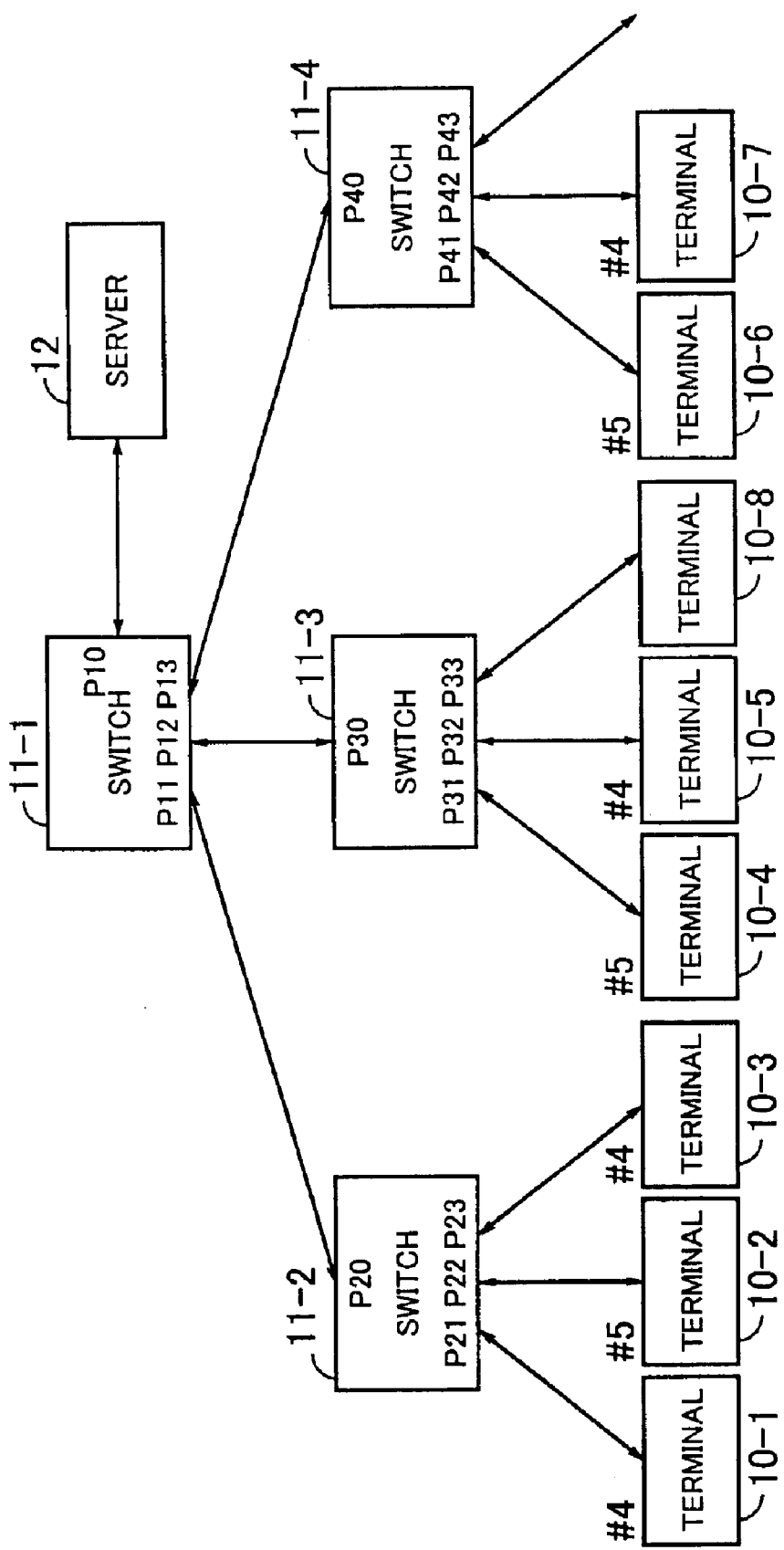
FIG. 12 is a diagram showing a situation where a new terminal has been added in the system of FIG. 3.

Referring next to FIG. 12, the following section will now describe how the proposed network system deals with a newly added terminal.

FIG. 12 illustrates such a situation where a new terminal 10-8 has just been connected to the switch 11-3. Outgoing frames from the terminal 10-8 are now being entered to the switch 11-3. With reference to its local VLAN configuration table, the switch 11-3 finds out that those frames are coming from some new terminal which has no relevant record in the table. The switch 11-3 then sends a query message to the server 12, requesting information about that unknown terminal. Frames received from the terminal 10-8 are either queued in the switch 11-3 or just discarded, until the server 12 responds to the query and the table is updated. As previously explained, the server 12 extracts the header field 31a (i.e., switch IP address+switch ID) from the received query message (FIG. 11(B)), and consults its switch data table (FIG. 7) to determine whether the requesting switch is enrolled as a valid switch. If a relevant record is found in the table, the server 12 extracts the Terminal Address field 31b (FIG. 11(B)) and searches the terminal data table (FIG. 8) for a record relevant to the terminal in question.

In the present context, the server 12 attempts to add a new entry to the terminal data table according to the policy option (5) described earlier, because the terminal 10-8 has no entry in the table. Suppose here that the selected policy says "add a new entry only when the terminal is allowed to become a member of a specific VLAN." Consulting its VID data table (FIG. 9), the server 12 then suggests a specific VLAN to which the newly added terminal 10-8 is supposed to belong. Subsequently, the server 12 refers to its switch data table (FIG. 7) to determine whether the requesting switch 11-3 can provide connection paths of the suggested VLAN. Consider, for example, that the terminal 10-8 presumably belongs to VLAN #5. As seen from the switch data table of FIG. 7, the switch 11-3 supports VLAN #5. Accordingly, the server 12 understands that the requesting switch 11-3 can provide connection paths of VLAN #5. The server 12 adds an entry for the terminal 10-8 to its terminal data table (FIG. 8). After that, the server 12 assembles a response frame, whose structure is shown in FIG. 11(B), by arranging the IP address and identifier of the switch 11-3, as well as the MAC address and VID of the newly added terminal 10-8. The server 12 sends such a response frame back to the requesting switch 11-3. With this response from the server 12, the switch 11-3 updates its own VLAN configuration table (FIG. 5), so that the entry for the port P33 will contain necessary parameters of the terminal 10-8, including the VID value of "5" assigned thereto. The switch 11-3 is now ready to perform the tagging of transmission frames originating from the newly added terminal 10-8. The VID value of "5" contained in the tagged frames indicates that the terminal 10-8 is a member of VLAN #5, allowing the other switches to handle those frames accordingly.

Besides returning the above-described response frame to the switch 11-3, the server 12 sends a notification frame to the switch 11-1, informing that a new terminal 10-8 belonging to VLAN #5 has been added at the network portion relevant to port 12 of the switch 11-1. This means that the port P12 is now required to handle tagged frames with a VID valued of "5" because of the enrollment of the new terminal 10-8. As previously noted, this notification, is not necessarily provided when that the switch 11-1 supports the GVRP protocol specified in IEEE 802.1Q, or when the switch 11-1 has no knowledge about the network topology. At any rate, if such a notification frame is received from the server 12, the switch 11-1 updates its own VLAN configuration table accordingly. In the case that no such notification frame is provided for any reason, the network administrator should do some necessary set-up task. To this end, the system may be designed to notify the administrator of the addition of a new terminal.

To summarize the above section, when a new terminal is added to the network, its local switch consults the VID data table to determine to which VLAN the terminal is supposed to belong. The VLAN configuration table in each switch is updated in accordance with the new setup. In this way, the proposed system automatically reconfigures itself and immediately enables the new terminal to start communication sessions.

Figure 13:
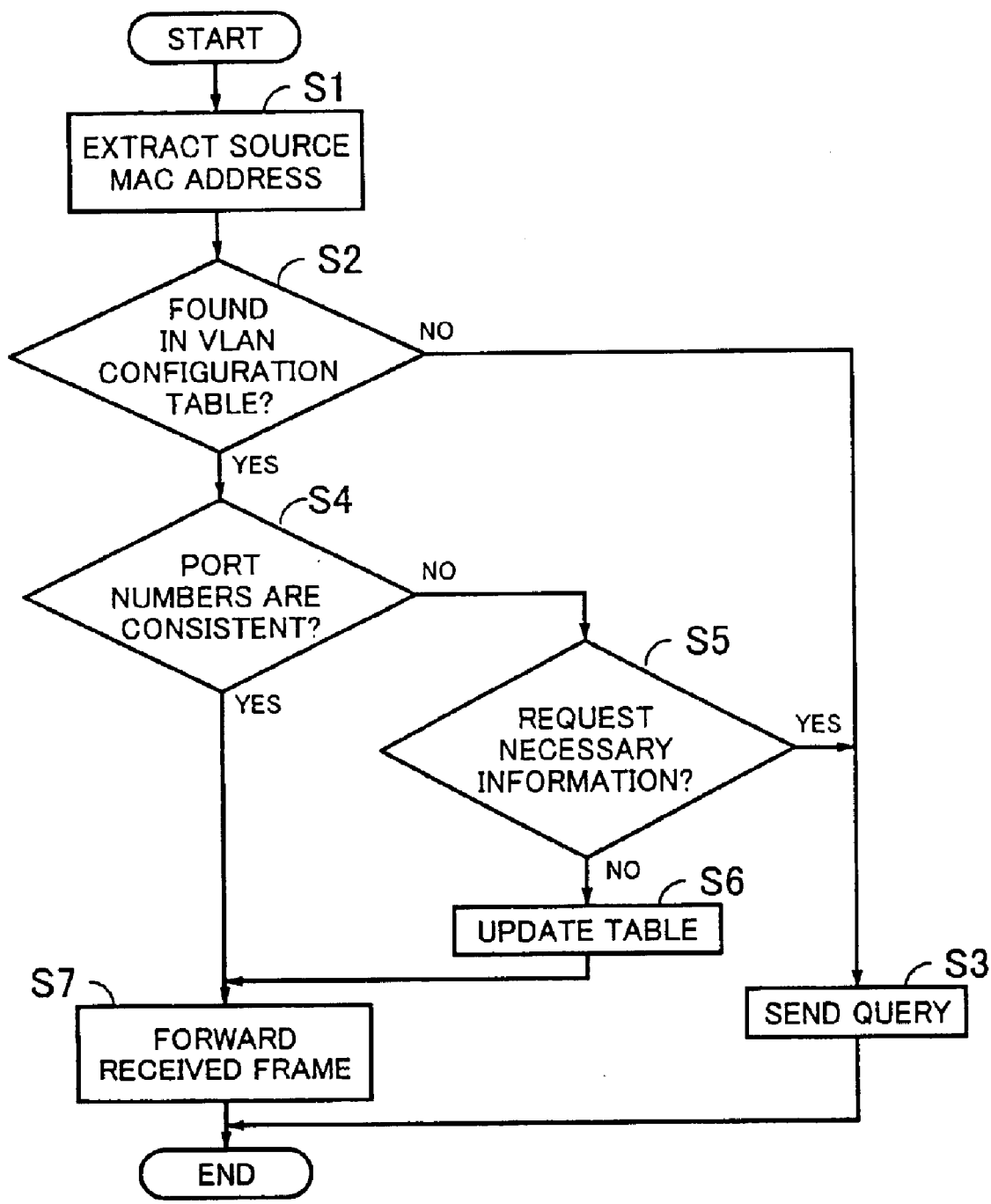
FIG. 13 is a flowchart which shows a process executed by the switches in the system of FIG. 3.

Referring next to the flowchart of FIGS. 13 to 17, various processes executed in the present embodiment will now be described below. FIG. 13 explains the details of a process that the switches 11-1 to 11-4 execute when they receive a non-tagged frame. This process comprises the following steps.

(S1) The controller 11*b* obtains a received non-tagged frame from the relaying processor 11*a* and extracts therefrom the MAC address of the source terminal.

(S2) Consulting the VLAN configuration table stored in the memory 11*c*, the controller 11*b* determines whether the table has any entry relevant to the MAC address extracted at step S1. If such an entry is found, the process proceeds to step S4. If not, the process advances to step S3.

(S3) The controller 11*b* assembles a query frame according to the formats shown in FIGS. 11(A) and 11(B), and transmits it to the server 12 via the laying processor 11*a*.

(S4) Scanning the VLAN configuration table (FIG. 5), the controller 11*b* finds a particular entry that is relevant to the source MAC address obtained at step S1. With the information provided in this table entry, the controller 11*b* then identifies which port is associated with the source MAC address. It now determines whether the identified port is where the non-tagged frame in question has actually been received. If so, the process advances to step S7. If not, it proceeds to step S5.

That is, if the port number defined in the VLAN configuration table does not agree with the port which actually accepted the frame in question, this implies that the connection of that source terminal has been changed within the same local terminal group. If this is the case, the process advances to step S5.

(S5) Based on the aforementioned policy option (2) stored in the memory 11*c*, the controller 11*b* determines whether to issue a query message. If it is determined to do so, the process proceeds to step S3. Otherwise, the process advances to step S6.

That is, when a terminal has been relocated within a group of terminals being local to a specific switch (i.e., within the same local terminal group), the controller in that switch will handle this event according to the aforementioned policy option (2). If the first policy "request the server to provide necessary information" is selected, the process advances to step S3. If the second policy "update the configuration data by itself" is chosen, the process advances to step S6.

(S6) The controller 11*b* updates the VLAN configuration table. That is, the controller 11*b* alters the association between the source MAC address and port number.

(S7) The controller 11*b* passes the received frame to the relaying processor 11*a*, thereby forwarding it through an appropriate port.

Figure 14:
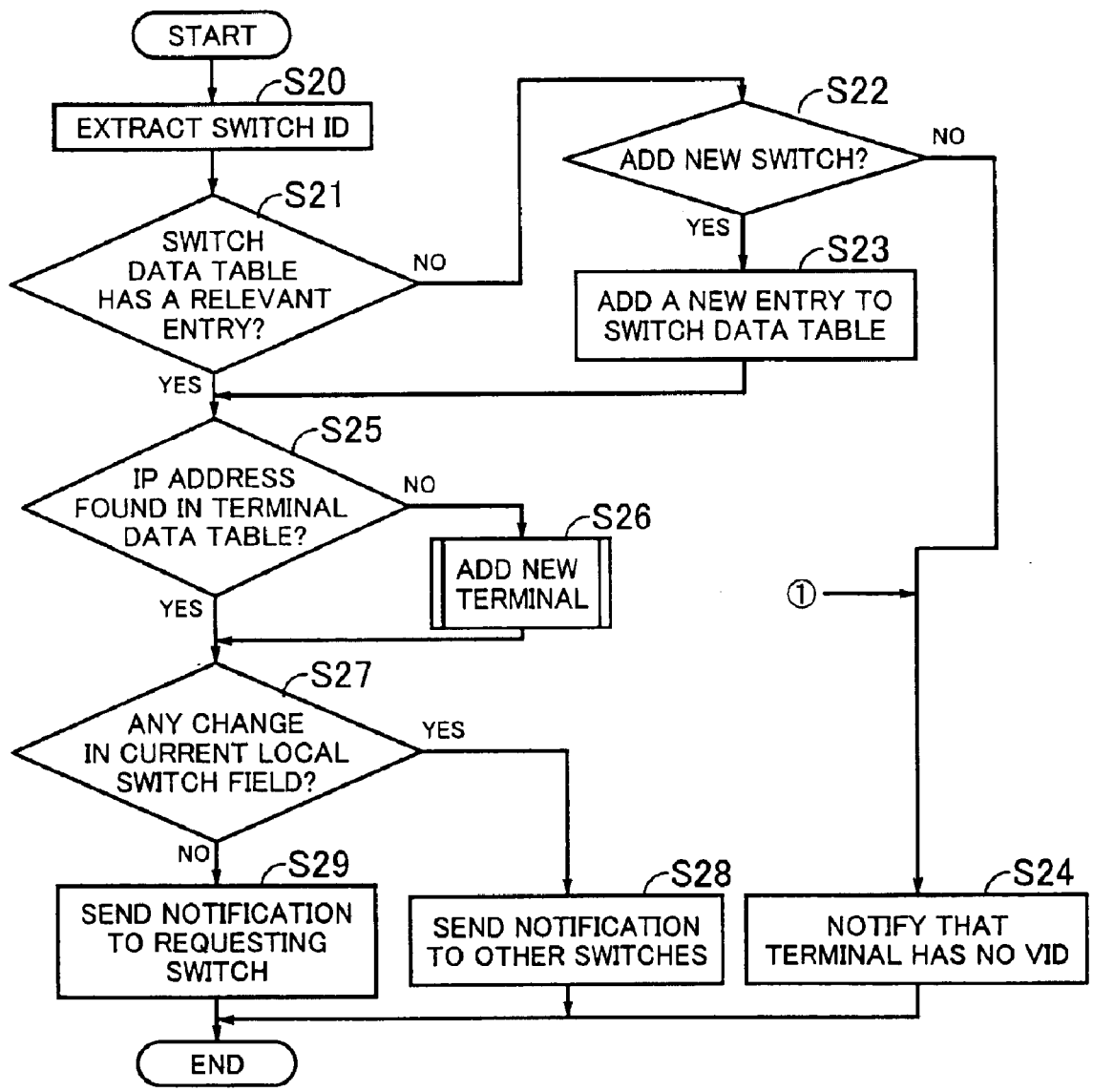
FIG. 14 is a flowchart which shows a process executed by the server in the system of FIG. 3.

Referring next to FIG. 14, the following steps shows a process that the server 12 executes in response to a query message.

(S20) The CPU 12*a* in the server 12 is supplied a query message from the network interface 12*f*. It then extracts the switch ID from the header field 31*a* (FIG. 11, "switch IP address+switch ID") of the message.

(S21) Consulting the switch data table stored in the HDD unit 12*d*, the CPU 12*a* determines whether there is a table entry relevant to the requesting switch. If such an entry is found, the process advances to step S25. If not, it proceeds to step S22.

(S22) Since the requesting switch is unknown, the CPU 12*a* now refers to the aforementioned policy option (3) stored in the HDD unit 12*d* to determine whether to add a new entry to the switch data table. If the predetermined policy (3) tells the server 12 to do so, the process advances to step S23. If not, it proceeds to step S24.

(S23) The CPU 12*a* adds a new entry to the switch data table (FIG. 7), referring to the aforementioned VID specification (4) stored in the HDD unit 12*d*. As previously noted, the VID specification (4) defines which VLANs a newly enrolled switch should support.

(S24) The CPU 12*a* notifies the requesting switch that the terminal in question has no VID assigned.

(S25) The CPU 12*a* determines whether the terminal data table (FIG. 8) has a relevant entry to the IP address of the terminal in question. If such a table entry does exist, the process advances to step S27. If not, it proceeds to step S26. This test detects such a situation where an existing terminal has been relocated from one switch's local terminal group to another switch's. If this is the case, the IP address of the terminal can be found in the terminal data table, and thus the current process advances to step S27.

(S26) When it is appropriate to register a new terminal to the terminal data table, the CPU 12*a* executes an "add new terminal" routine. The details of this process will be described later with reference to FIG. 15.

(S27) Examining the "Current Local Switch" field of the terminal data table shown in FIG. 8, the CPU 12*a* determines whether to change the field value. If the "Current Local Switch" field has to be changed, the process advances to step S28. If no change is required, it proceeds to step S29.

The "Current Local Switch" field needs no change in the case that the terminal in question remains within the same switch's local terminal group. The process then advances to step S29 in this case. Also, when the "Current Local Switch" status of the terminal is "Unknown" at present, this situation is equated with addition of a new terminal. Accordingly, the process advances to step S29.

(S28) Via the network interface 12f, the CPU 12a transmits a notification frame to switches other than the requesting switch, as described earlier in FIGS. 11(A) and 11(C). This frame informs those switches about to which port the terminal in question has been attached.

(S29) Via the network interface 12f, the CPU 12a transmits a response frame to the requesting switch, as described earlier in FIGS. 11(A) and 11(B). This frame provides the switch with the VID of the terminal.

In order for a switch to make a notification about to which port a terminal in question is coupled, the switch must have enough knowledge about topological configuration of the network. If only an insufficient knowledge is available, then the switch requests the network management server to provide information on the current usage of every switch, and searches for such switches that are related to a specific VLAN to which the terminal in question belongs to. The switches identified as such are then notified of the following information: (a) which terminal has been newly attached or relocated, (b) what VID the terminal has, (c) to which port the terminal has previously been connected, and (d) to which port the terminal is currently connected.

Figure 15:
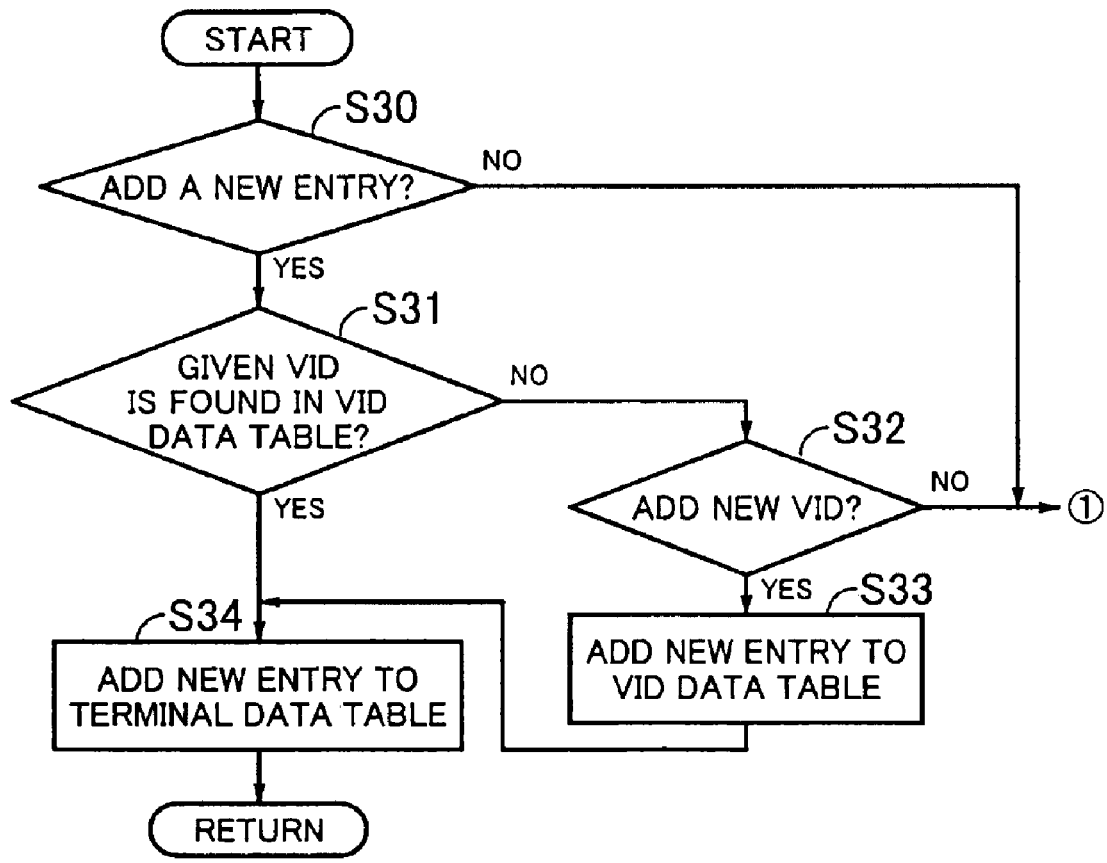
FIG. 15 is a flowchart which explains the details of "Add new terminal" routine shown in FIG. 14.

Referring next to FIG. 15, the details of the "add new terminal" routine called at step S26 in the flowchart of FIG. 14 will be described below. When it is called up, this routine is executed according to the following steps.

(S30) The CPU 12a reads out the aforementioned policy option (5) from the HDD unit 12d. If the selected option says "add a new entry whenever necessary" or "add a new entry only when the terminal is allowed to become a member of a specific VLAN," then the process advances to step S31. Otherwise, it returns to step S24 of FIG. 14. In other words, it is determined whether to update the terminal data table with a new entry describing the terminal in question. When it is decided to add this new entry, the process advances to step S31.

(S31) Here, the terminal in question has a VID value that represents its VLAN membership. The CPU 12a then scans the VID data table (FIG. 9) to check whether the given VID is present. If the VID is found, the process proceeds to step S34. If not, the process branches to step S32.

(S32) The CPU 12a determines whether to add a new VID. If it is determined to do so, the process advances to step S33. If not, the process returns to step S24 of FIG. 14. In other words, the process advances to step S33 when the selected policy option (5) says "add a new entry whenever necessary."

(S33) The CPU 12a enters a predetermined new VID to the VID data table. The process then goes to step S34.

(S34) The CPU 12a updates the terminal data table by entering information about the newly connected terminal. The control is now returned the calling process.

Through the process shown in the flowcharts of FIGS. 14 and 15, the proposed network system allows relocation of an existing terminal, as well as enrollment of a new terminal. In those cases, an appropriate VID is collected or selected, and this information is sent to the switches.

Figure 16:
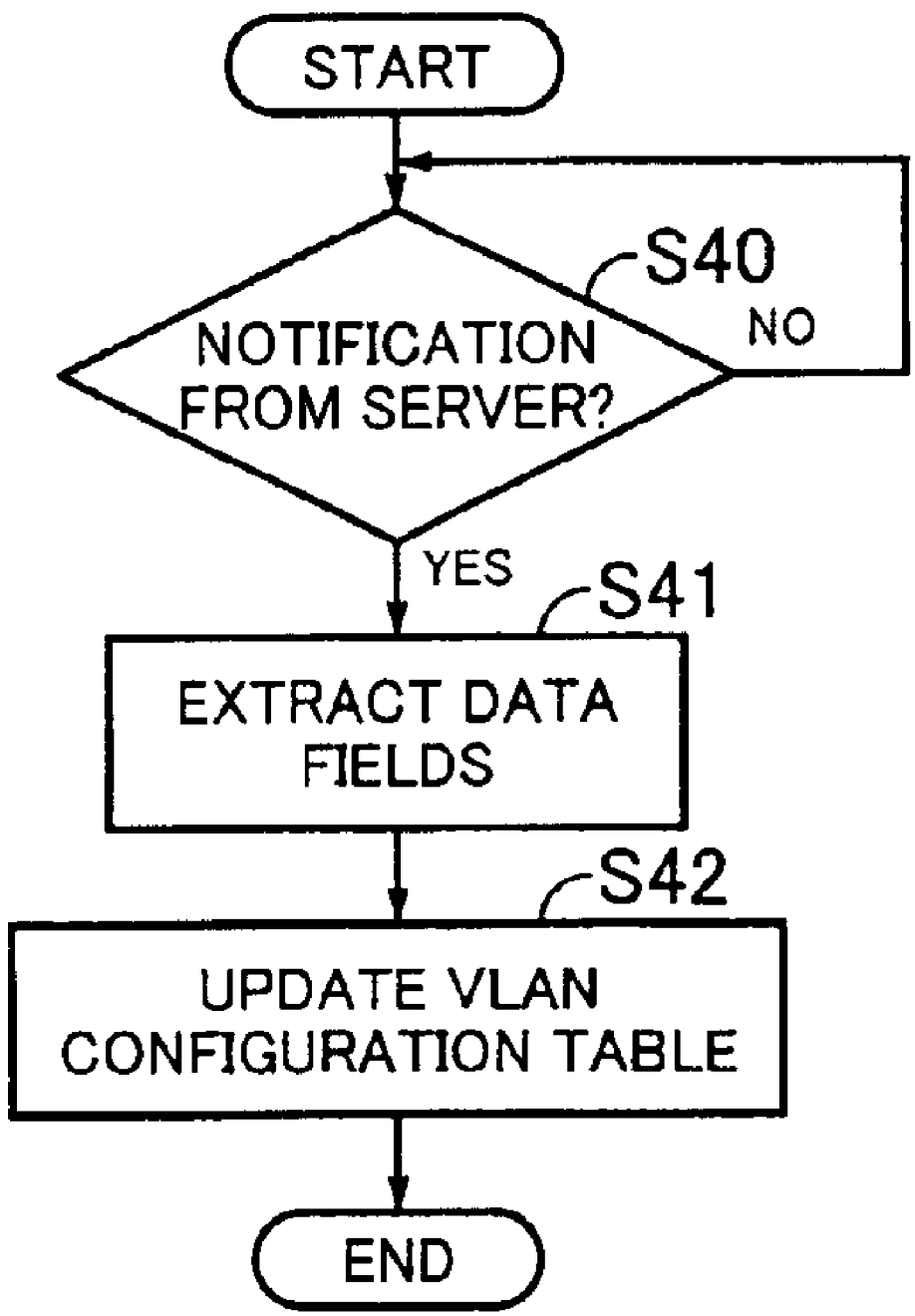
FIG. 16 is a flowchart which shows a process executed by a switch when it has received a notification frame from the server.

When a notification message is received from the server 12, the switches will operate as shown in the flowchart of FIG. 16. This process comprises the following steps.

(S40) The controller 11b obtains incoming frames from the relaying processor 11a and whether there is a notification message from the server 12. If a notification message is found, the process advances to step S41. If not, the process repeats the present step S40.

(S41) The controller 11b extracts data fields from the notification message, whose structure is shown in FIGS. 11(A) and 11(C).

(S42) With the extracted data, the controller 11b updates a relevant entry of the VLAN configuration table stored in the memory 11c.

Through those processing steps, the switches update their respective VLAN configuration tables in response to a notification message that the server 12 sends in the case of, for example, a change in the connection of terminals.

Figure 17:
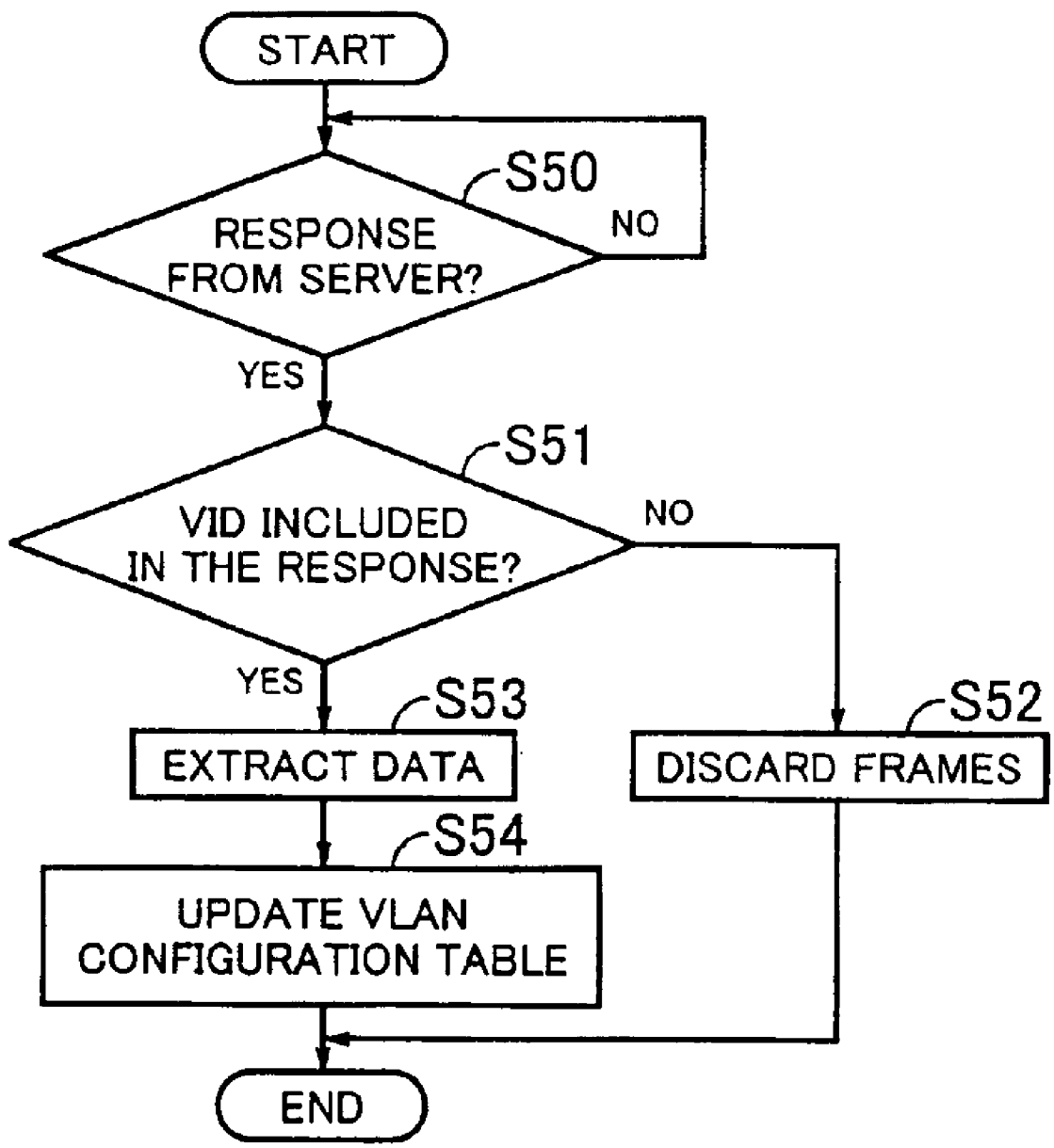
FIG. 17 is a flowchart which shows a process executed by a switch when it has received a response frame from a server.

When a response message is received from the server 12, the requesting switch will operate as shown in the flowchart of FIG. 17. The process comprises the following steps.

(S50) The relaying processor 11a passes received frames to the controller 11b, which determines whether there is a response frame from the server 12. If there is, the process advances to step S51. If not, the process repeats the present step S50.

(S51) The controller 11b determines whether the VID of the terminal in question is included in the response. If it is included, the process proceeds to step S53. Otherwise, the process advances to step S52.

See FIG. 11(B) for the response frame format. If the VID field 31c contains the VID of the terminal in question, the process advances to step S53.

(S52) The controller 11b discards incoming frames from the newly connected terminal.

(S53) The controller 11b extracts other data from the received response frame.

(S54) With the extracted data, the controller 11b updates a relevant entry of the VLAN configuration table stored in the memory 11c.

Through the above steps, the switches update their own VLAN configuration table when they have received a response message from the server 12 in reply to their queries.

In the above embodiment of the invention, messages for use in server-switch communication sessions have been described as being constructed in a proprietary format shown in FIGS. 11(A) to 11(C). However, it is not intended to limit the implementation of frames to this specific format. It is also possible to use standard frame formats such as those in the Simple Network Management Protocol (SNMP) or Common Open Policy Service (COPS), as will be described below.

Figure 18A:
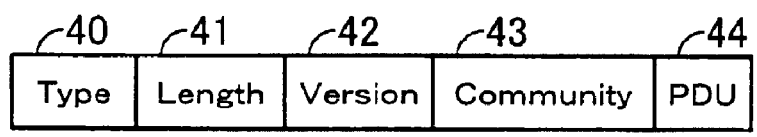
FIGS. 18(A), 18(B), and 18(C) are diagrams showing data message structures based on the SNMP frame format which is used in data exchange between a switch and a server.
Figure 18B:
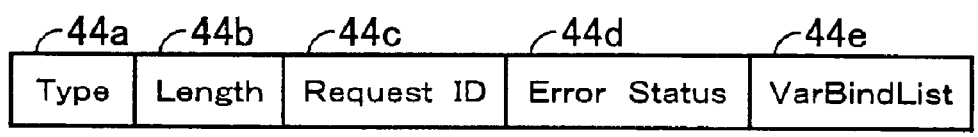
Figure 18C:
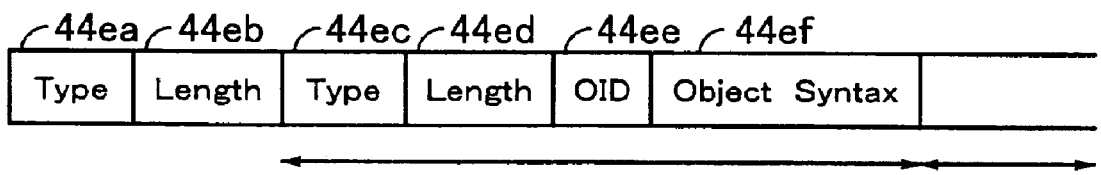

FIGS. 18(A) to 18(C) show several data message structures based on SNMP frame format. First, FIG. 18(A) gives the entire structure of an SNMP frame, which comprise the following fields: "Type" 40, "Length" 41, "Version" 42, "Community" 43, and "Protocol Data Unit (PDU)" 44. The last portion, PDU field 44, conveys the body of a message that is exchanged between a switch and a server.

FIG. 18(B) shows the detailed data structure of the PDU field 44. Actually, the PDU field 44 comprises the following fields: "Type" 44a, "Length" 44b, "Request ID" 44c, "Error Status" 44d, and "VarBindList" 44e. The proposed usage of those data fields are as follows.

Type field 44a indicates what this frame is intended for. In the SNMP terminology, this field may indicate: Get Request (query), Get Response (response), or Set Request (notification). Shown in parentheses are the corresponding terms that have been used in the present description of the invention.

Length field 44b indicates the data length.

Request ID field 44c carries a sequence number created upon receipt of each query, so that the produced response messages can be correctly associated with their original query messages.

Error Status field 44d contains SNMP error status information.

VarBindList field 44e contains multiple pieces of information shown in FIG. 18(C).

Referring to FIG. 18(C), the VarBindList field 44e begins with "Type" subfield 44ea and "Length" subfield 44eb. They are followed by a single VarBind block or a series of VarBind blocks. Each VarBind block is composed of the following subfields: "Type" 44ec, "Length" 44ed, "Object ID (OID)" 44ee, and "Object Syntax" 44ef. In the example of FIG. 18(C), the Object Syntax field 44ef contains the body of a message exchanged between a switch and a server, and the preceding OID field 44ee indicates what kind of data is stored in the Object Syntax field 44ef.

Figure 19A:
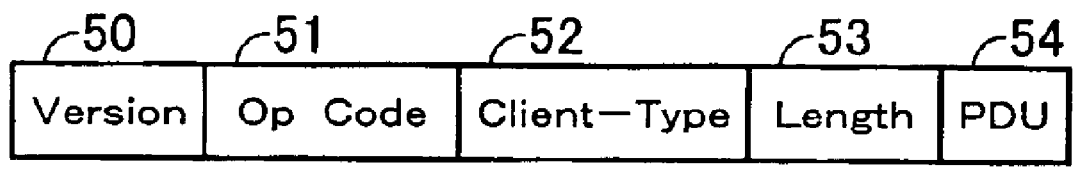
FIGS. 19(A) and 19(B) are diagrams showing data message structures based on the COPS frame format which is used in data exchange between a switch and a server.
Figure 19B:
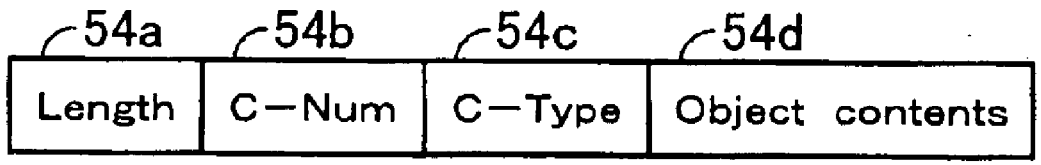
Figure 20:
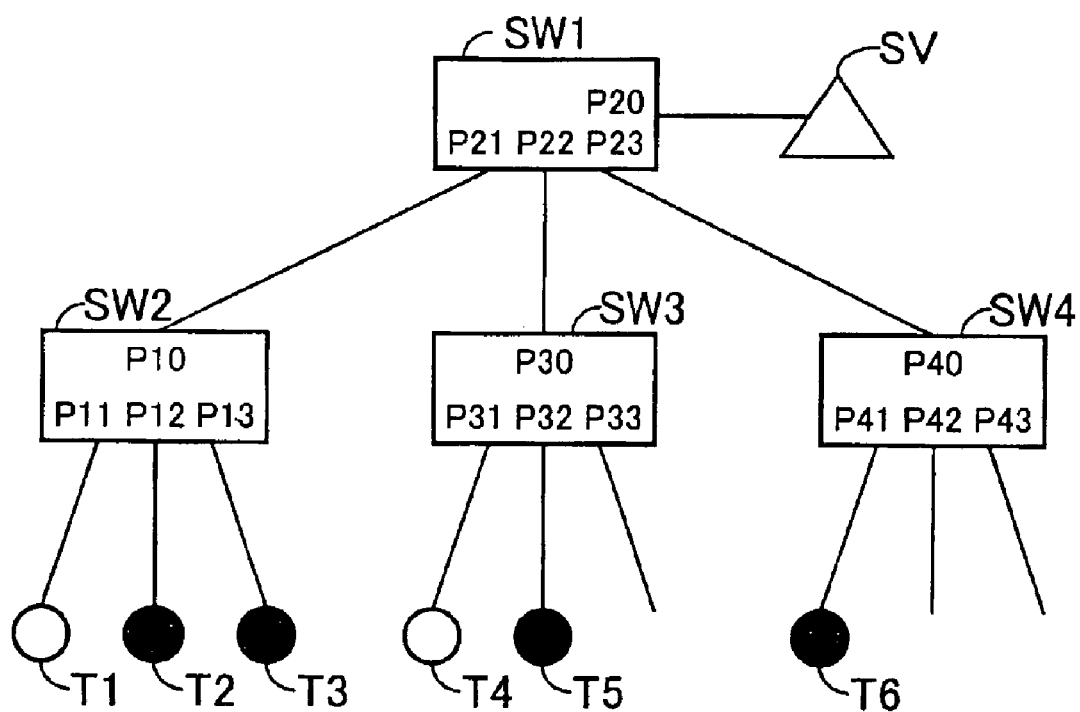
FIG. 20 is a diagram which shows a typical structure of a conventional network system which supports virtual LAN configurations.
Figure 21:
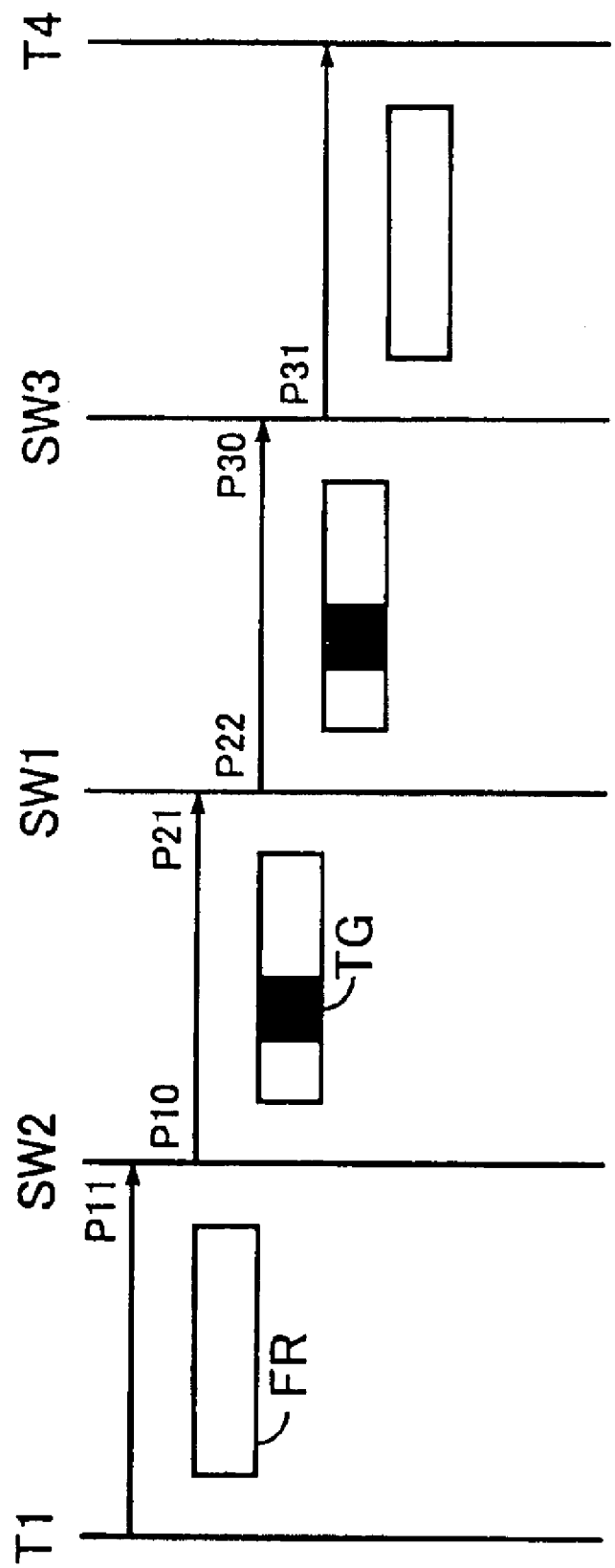
FIG. 21 is a diagram which shows how a frame is transported from a terminal T1 to another terminal T5 in the network system of FIG. 20.

FIGS. 19(A) and 19(B) show the COPS frame structure. First, FIG. 19(A) gives the outline of a COPS frame, which comprises the following fields: "Version" 50, "op Code" 51, "Client-Type" 52, "Length" 53, and "PDU" 54.

Version field 50 shows the version number of the COPS protocol being implemented.

Op Code field 51 contains information that shows what this COPS frame is intended for. In the COPS terminology, this field may indicate: Request (query), Decision (notification), or Report State (response).

Shown in parentheses are the corresponding terms that have been used in the present description of the invention.

Client-Type field 52 indicates the type of client.

Length field 53 indicates the data length of the PDU field 54.

PDU field 54 contains information shown in FIG. 19(B).

Referring next to FIG. 19(B), the PDU field 54 is composed of the following fields: "Length" 54a, "C-Num" 54b, "C-Type" 54c, and "Object contents" 54d. The proposed usage of those fields is as follows.

Length field 54a indicates the data length of the Object contents field 54d.

C-Num field 54b is set to nine, which indicates that the object contents field 54d carries client specific information.

C-Type field 54c is treated as a "don't care" field (i.e., disregarded) in the present embodiment.

Object contents field 54d contains the body of a message exchanged between a switch and a server.

In this way, a slight extension to standard protocol specifications makes switch-server communication possible.

The present invention provides automatic reconfiguration functions for VLANs. Once the server and switches are properly set up at a system initialization phase, subsequent changes such as terminal movements can be tracked by the system, without the need for intervention of network administrators. When a new terminal is connected, the system automatically enrolls it in an appropriate VLAN, thus allowing immediate startup without manual setting by the administrators. As such, the present invention totally alleviates the administrative workloads to maintain the network system.

The above-described processing mechanisms are actually implemented as software and hardware functions of a computer system. The process steps of the proposed network system are encoded into computer programs, which can be stored in an appropriate computer-readable storage medium. The computer system executes those programs to provide the intended functions of the present invention. Suitable computer-readable storage media include magnetic storage media and solid state memory devices. Portable storage media, such as CD-ROMs and floppy disks, are particularly suitable for circulation purposes. Further, it will be possible to distribute the programs through an appropriate server computer deployed on a network. The program files delivered to users are normally installed in their computer's hard drive or other local mass storage devices, and they are executed after being loaded to the main memory.

The processing steps that the server executes are relatively simple and can be implemented as software programs. They can even be provided as additional plug-ins for existing software of DNS servers and/or network management system (NMS) servers. It is therefore possible to integrate all those server functions on a single platform. Such a plug-in solution and the approach of integrated DNS/NMS servers also make it possible to provide a user-friendly network configuration screen.

At an initial setup stage, the associations between terminals and their VLAN domains are defined at the server in an organized way. Even when the network employs a large number of switches, they can be configured with simple parameters, with the reduced need for administrative tasks of configuring each switch.

Further, in the proposed network system, the server is where the VLAN membership of each terminal is determined. This arrangement simplifies the function of each switch, thus enabling the production of cost effective network switches.

The above discussion will now be summarized as follows. The present invention provides a network system comprising a plurality of terminals and switches and a server. Each terminal belongs to one of a plurality of logical groups, or VLANs. The switches interconnect the terminals by receiving and forwarding the packets originating therefrom. Each switch comprises: a first storage unit which stores information that is used to identify logical group membership of the source terminal of a received packet; a query unit which sends a query to request information about the logical group membership, when the first storage unit has failed to provide sufficient information to identify the logical group membership of a particular source terminal; and an updating unit which updates the information stored in the first storage unit according to a response to the query. The server comprises: a second storage unit which stores a list of identifiers of the terminals, in association with the logical groups to which the terminals belong; a searching unit which searches the second storage unit in response to the query from the requesting switch; and a transmission unit which sends the search result to the requesting switch. This structural arrangement permits the network system to quickly reconfigures its VLAN setup, even when a terminal is relocated or newly added.

The present invention also provides a switch for use in a network system where a plurality of terminals are interconnected by a plurality of switches that receive and forward packets originating from the terminals under the control of a server. This switch comprises: a storage unit which stores information that is used to identify logical group membership of the source terminal of a received packet; a query unit which sends a query the server to request information about the logical group membership, when the storage unit has failed to provide sufficient information to identify the logical group membership of a particular source terminal; and an updating unit which updates the information stored in the storage unit according to a response to the query sent by the query unit. This structural arrangement eliminates many of troublesome operations for VLAN setup, thus alleviating the workload imposed on the network administrators.

Further, according to the present invention, a server for use in a network system is provided. To control a plurality of switches interconnecting a plurality of terminals, this server comprises: a storage unit which stores a list of identifiers of the terminals in association with logical groups to which the terminals belong; a searching unit which searches the storage unit in response to a query from one of the switches; and a transmission unit which sends the search result to the switch that has sent the query. This structural arrangement permits a relocated or newly added terminal to quickly start communication sessions with other terminals.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network system comprising:
   (a) a plurality of terminals which send and receive packets, each terminal belonging to one of a plurality of logical groups;
   (b) a plurality of switches which interconnect said plurality of terminals by receiving and forwarding the packets originating from said terminals, each of said switches comprising:
      first storage means for storing information that is used to identify logical group membership of a source terminal of a received packet,
      query means for sending a query to request information about the logical group membership, when said first storage means has failed to provide sufficient inflation to identify the logical group membership of a particular source terminal, and
      updating means for updating the information stored in said first storage means according to a response to the query sent by said query means; and
   (c) a server which controls said plurality of switches, comprising:
      second storage means for storing a list of identifiers of the terminals, in association with the logical groups to which the terminals belong,
      searching means for searching said second storage means in response to the query from a requesting switch,
      transmission means for receiving a search result from said searching means and sending the search result to said requesting switch,
      supposition means for suggesting a specific logical group to which said source terminal in question is supposed to belong, based on the identifier of the source terminal, when said searching means has failed to provide the requested information; and
      third storage means for storing a list of the switches being available in the network system, in association with a list of the logical groups that can be assigned to the terminals belonging to each switch's local terminal group,
      wherein, when the query is received from said requesting switch, said server consults said third storage means to find logical group relevant to said requesting switch, and if the relevant logical groups do not include the logical group to which said source terminal in question is supposed to belong, prevents enrollment of said source terminal in a non-included logical group.

2. The network system according to claim 1, wherein said transmission means sends the search result to other switches in addition to said requesting switch.

3. The network system according to claim 1, wherein said server further comprises logical group producing means for producing a new logical group when said supposition means has failed to suggest any specific logical group for said source terminal in question.

4. The network system according to claim 1, wherein said server further comprises notification means for so notifying an administrator if said requesting switch is not included in the list of the available switches.

5. The network system according to claim 1, wherein said server further comprises registration means for adding an entry for said requesting switch to said third storage means, when the list of the available switches does not include said requesting switch.

6. A server for use in a network system, which controls a plurality of switches that interconnect a plurality of terminals by receiving and forwarding packets originating from the terminals, the server comprising:
   storage means for storing a list of identifiers of the terminals, in association with logical groups to which the terminals belong;
   searching means for searching said storage means in response to a query from one of the switches;
   transmission means for receiving a search result from said searching means and sending the search result to the switch that has sent the query;
   supposition means for suggesting a specific logical group to which a source terminal in question is supposed to belong, based on the identifier of the source terminal, when said searching means has failed to provide the requested information;
   another storage means for storing a list of the switches being available in the network system, in association with a list of the logical groups that can be assigned to the terminals belonging to each switch's local terminal group,
   wherein, when the query is received from a requesting switch, said server consults said another storage means to find logical groups relevant to said requesting switch, and if the relevant logical groups do not include the logical group to which said source terminal in question is supposed to belong, prevents enrollment of said source terminal in a non-included logical group.

7. A computer-readable medium which stores a computer program being designed to run on a computer in order to cause the computer to fiction as a server comprising:
   storage means for storing a list of identifiers of terminals, in association with logical groups to which the terminals belong;
   searching means for searching said storage means in response to a query from one of the switches;
   transmission means for receiving a search result from said searching means and sending the search result to the switch that has sent the query;
   supposition means for suggesting a specific logical group to which a source terminal in question is supposed to belong based on the identifier of the source terminal, when said searching means has failed to provide requested information; and
   another storage means for storing a list of the switches being available in the network system, in association with a list of the logical groups that can be assigned to the terminals belongings to each switch's local terminal group;

wherein, when the query is received from a requesting switch, the server consults said other storage means to find logical groups relevant to the requesting switch, and if the relevant logical groups do not include the logical group to which said source terminal in question is supposed to belong, prevents enrollment of said source terminal in a non-included logical group.

* * * * *